United States Patent [19]

Anderson et al.

[11] Patent Number: 4,639,653
[45] Date of Patent: Jan. 27, 1987

[54] METHOD AND APPARATUS FOR PERFORMING WORK IN A THREE DIMENSIONAL SPACE

[75] Inventors: Robert L. Anderson, Boulder; James A. Pilarski, Northglenn; Jerry A. Klintz, Boulder, all of Colo.

[73] Assignee: Applied Microbotics Corporation, Boulder, Colo.

[21] Appl. No.: 723,552

[22] Filed: Apr. 15, 1985

[51] Int. Cl.⁴ .............................................. G05B 11/28
[52] U.S. Cl. .................................. 318/599; 318/568; 318/570; 318/571
[58] Field of Search ................ 318/599, 568, 570, 571

[56] References Cited

U.S. PATENT DOCUMENTS

| | | | |
|---|---|---|---|
| 3,842,330 | 10/1974 | Kollel | 318/574 |
| 4,031,669 | 6/1977 | Koide et al. | 51/142 |
| 4,404,507 | 9/1983 | Dean et al. | 318/570 |
| 4,477,754 | 10/1984 | Roch et al. | 318/568 |

OTHER PUBLICATIONS

EIA Standard RS-274-C—Excerpts from National Codes "Interchangeable Perforated Tape Variable Block Format for Positioning, Contouring, and Contouring/Positioning Numerically Controlled Machines" pp. 271-278.

Primary Examiner—William M. Shoop, Jr.
Assistant Examiner—Saul M. Bergmann
Attorney, Agent, or Firm—Klass & Law

[57] ABSTRACT

Method and apparatus for moving a workpiece and/or a tool to various locations in a three-dimensional space to perform operations on the workpiece wherein a micro-computer numeric control system is used to provide a multi-axis motion control system using DC electric servo motors, each of which responds to its own control system to operate mechanisms which cooperate to perform the desired operations on the workpiece.

43 Claims, 33 Drawing Figures

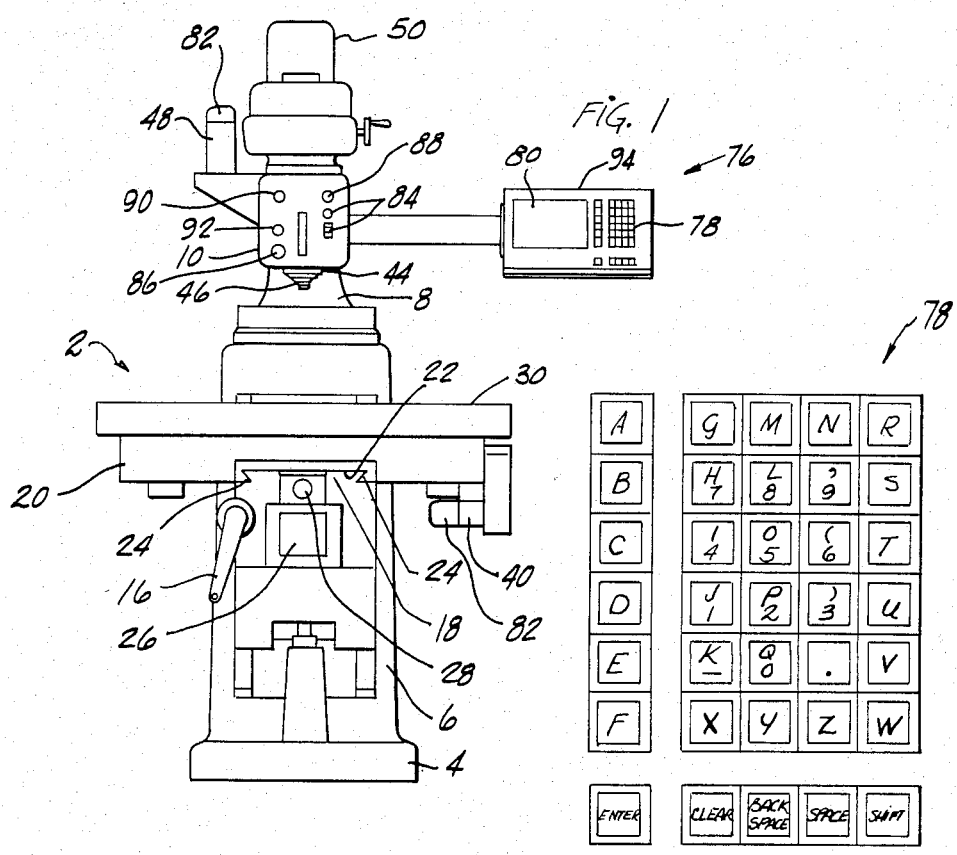
FIG. 1
FIG. 8
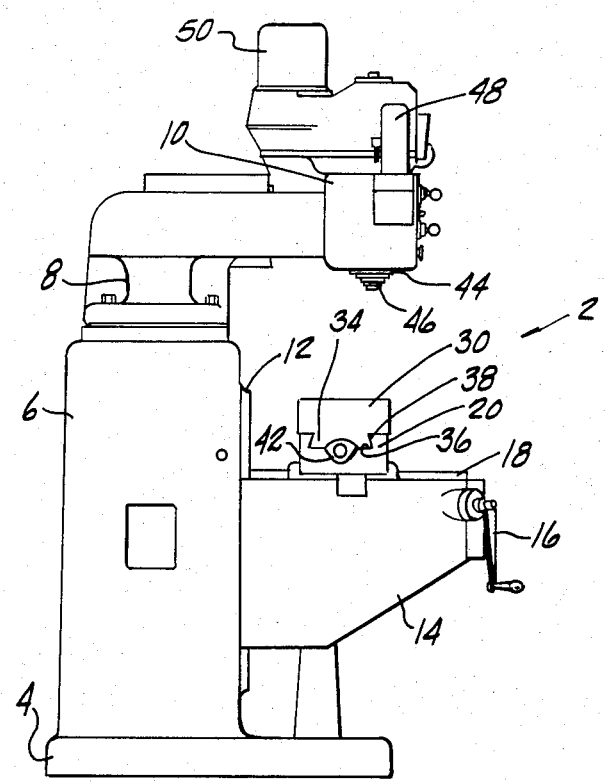
FIG. 2

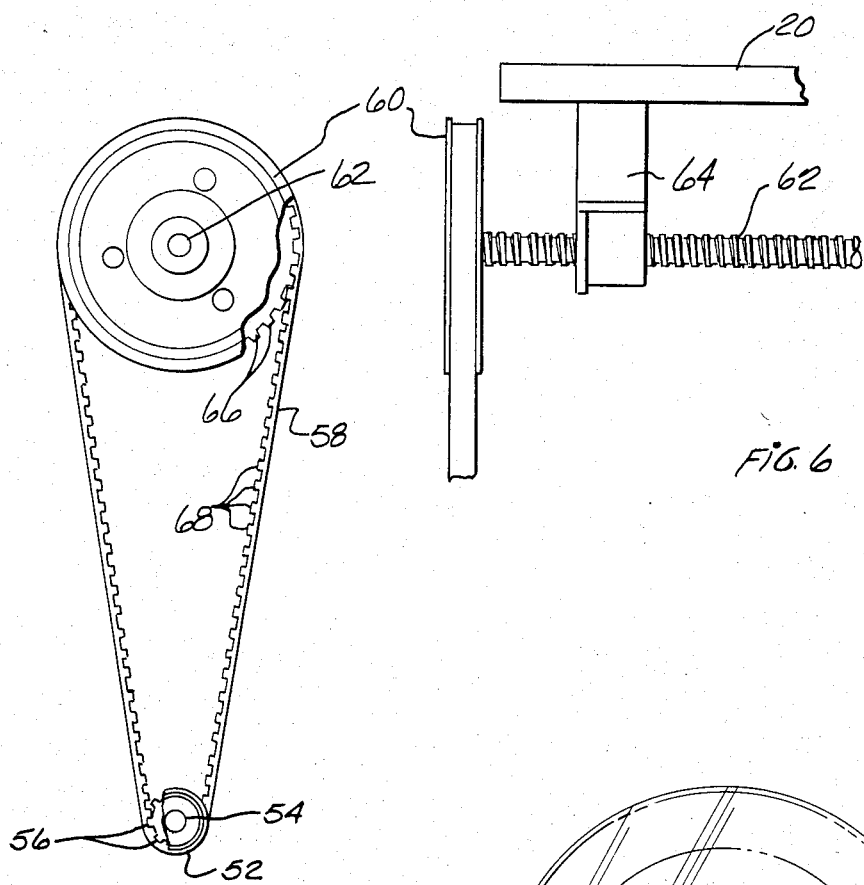
Fig. 6
Fig. 5
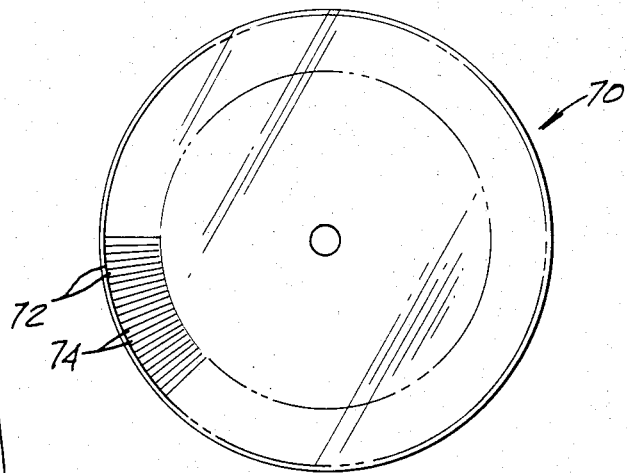
Fig. 7.
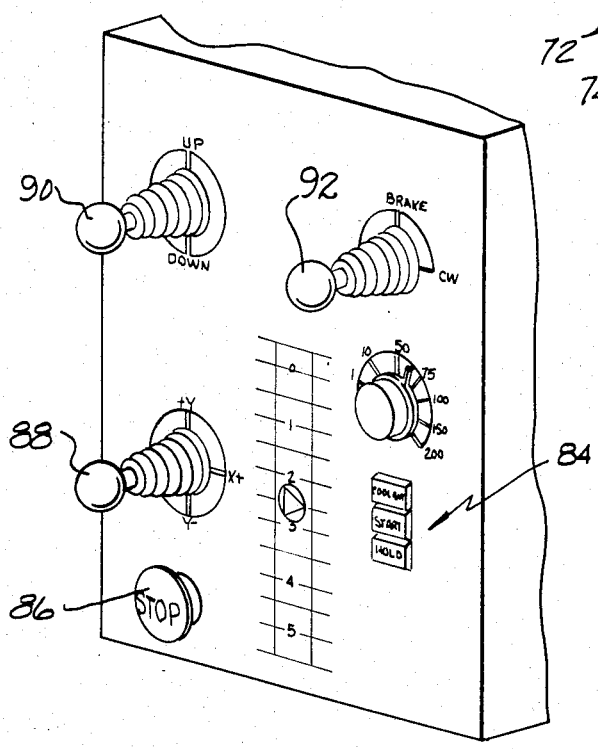
Fig. 9.

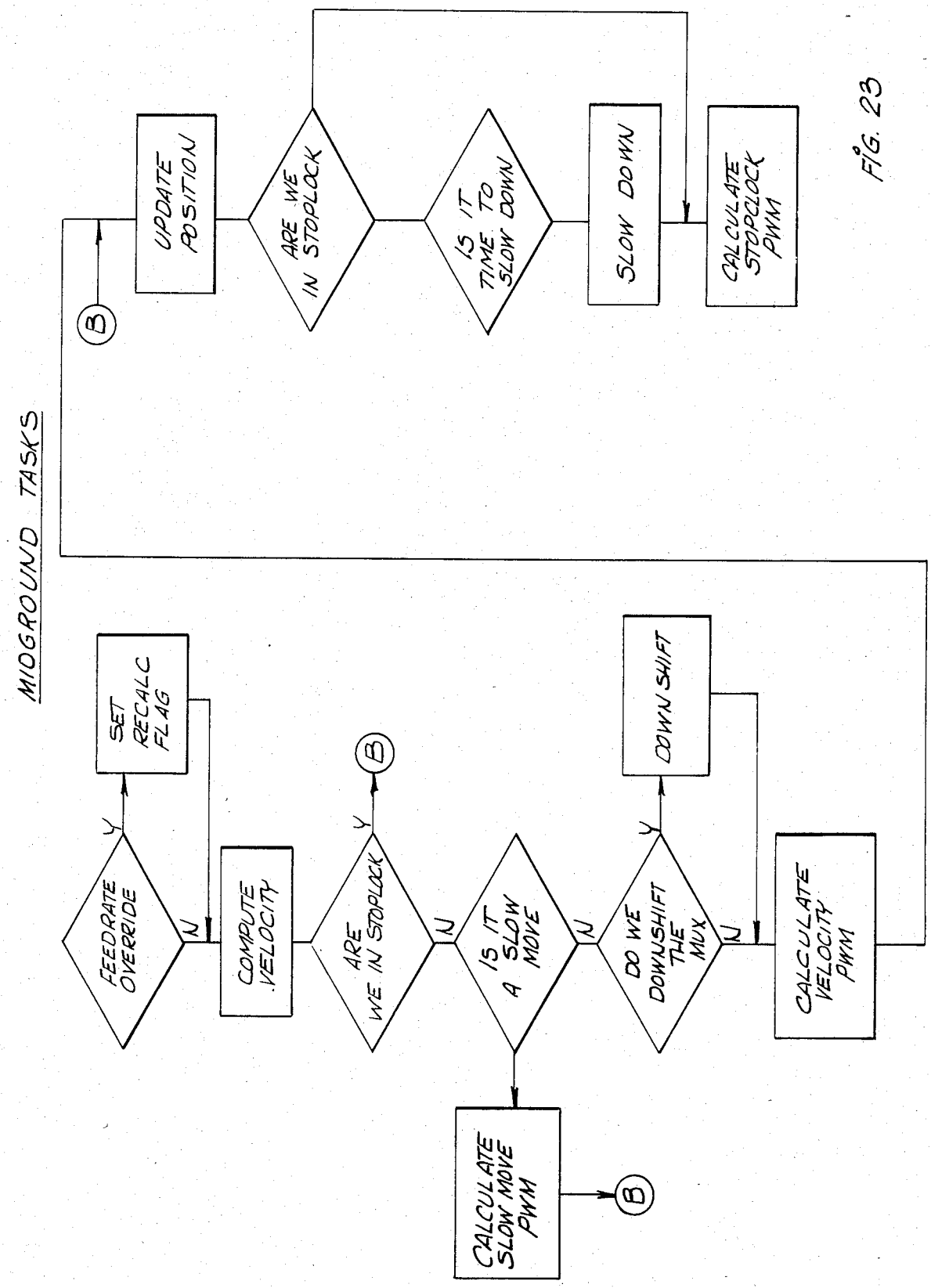

LINEAR POSITION MOVE

MOTION HOLD

INTERPRET RECEIVED MESSAGE,
BUILD MESSAGE TO TRANSMIT

AUTO ZERO

COORDINATED POSITION MOVE

FEEDRATE OVERRIDE

METHOD AND APPARATUS FOR PERFORMING WORK IN A THREE DIMENSIONAL SPACE

FIELD OF THE INVENTION

This invention relates to the field of performing a plurality of operations on a workpiece by a tool in locations that require the relative movement of the workpiece and/or tool to various locations in a three-dimensional space and more particularly to a multi-axis control system for the robot-like execution of a complex pattern of motions of the workpiece and/or tool in a three-dimensional space so that work may be performed by the tool on the workpiece.

BACKGROUND OF THE INVENTION

During the past several years, there has been increasing application in metal working machine tools of robot-like. systems for performing work by a tool on a workpiece. These systems are commonly referred to as computer numerical control systems. These systems utilize computer technology to provide memory storage for programs which enable the machine to be operated automatically. Computer numerical control systems allow very precise machining capabilities and small to medium volume part production with minimal input from the operator. Systems of this nature rely heavily on expensive hardware to insure the accurate operation of the system. In addition to the expense, equipment of this nature requires special programming that is rather complicated and generally requires some experience in computer programming. Another difficulty encountered in this field is the ability to keep the machine operating due to the availability of service and the costs of such service.

BRIEF DESCRIPTION OF THE INVENTION

This invention provides a micro-computer numeric control system to provide a multi-axis motion control system. The basic concepts are primarily directed to the use of software to replace hardware conventionally used in this type of system. The invention includes a DC servo electric motor that is driven by a relatively high DC voltage. These DC servo electric motors are designed to run at a relatively high motor torque to speed ratio which permits a substantial reduction in costs associated with motor tachometers to achieve the same control resolution normally associated with the more expensive motor tachometers. The invention also utilizes the natural damping characteristics of a DC servo electric motor to hold the various mechanisms in a stop lock mode by providing a circuit that provides a constant flow of current through the DC servo electric motor.

In the explanation of the invention set forth below, the micro-computer numeric control system is described in relation to a milling machine in which the work table on which a workpiece is located is moved generally in a horizontal plane along an x-axis and a y-axis while the quill, in which the tool is positioned, is moved in a direction along a z-axis which is perpendicular to the horizontal plane of the x and y axes. The work table is mounted on a knee of the milling machine which knee may be vertically adjusted by conventional means so as to accommodate workpieces of various sizes. A DC servo electric motor is provided for each of the x, y and z axes. Each DC servo electric motor responds to a signal generated by its own control means so as to drive suitable mechanisms which cooperate to move the workpiece and/or the tool so as to perform desired operations. In a preferred embodiment of the invention, the motor torque to speed ratio is between about 2.4 to 3.2 to 1 which permits the DC servo electric motor to be controlled using only an optical encoder responding to a motor tachometer having about 500 lines per revolution. The control means for each DC servo electric motor executes concurrently foreground tasks, midground tasks and background tasks in a relatively short period of time. The various movements of the workpiece and/or tool can be independent of each other or can occur simultaneously.

It is an object of this invention to provide a microcomputer numeric control system for controlling the relative movements of a workpiece and/or tool so that the tool can perform work on the workpiece in a three-dimensional space.

It is another object of this invention to provide a micro-computer numeric control system using DC servo electric motors wherein each motor responds to a signal generated by a control means which concurrently executes foreground tasks, midground tasks and background tasks.

It is a further object of this invention to provide a micro-computer numeric control system using a DC servo electric motor which operates using a relatively high DC voltage and has a relatively high motor torque to speed ratio so that it may respond directly to an optical encoder.

It is yet another object of this invention to provide a micro-computer numeric control system using a DC servo electric motor wherein the natural damping characteristics of the DC servo electric motor are utilized to hold the various mechanisms in a stop lock mode.

Other features and advantages of the invention will be apparent from the following more particular description of preferred embodiments as illustrated in the accompanying drawings in which like reference characters refer to the same parts throughout the various views. The drawing is not necessarily to scale, emphasis instead being placed upon illustrating the principles of the invention.

BRIEF DESCRIPTION OF THE DRAWING

FIG. 1 is front elevation of a schematic illustration of a machine for use with this invention;

FIG. 2 is a side elevation taken from the left of FIG. 1;

FIGS. 5 and 6 illustrates the drive means for moving the workpiece or the tool;

FIG. 7 is a plan view of a tachometer disk;

FIG. 8 is an elevational view of the keyboard;

FIG. 9 is a pictorial view of the control panel;

FIGS. 10-17 and 20-30 are flow charts;

DETAILED DESCRIPTION OF THE INVENTION

Figure 4:
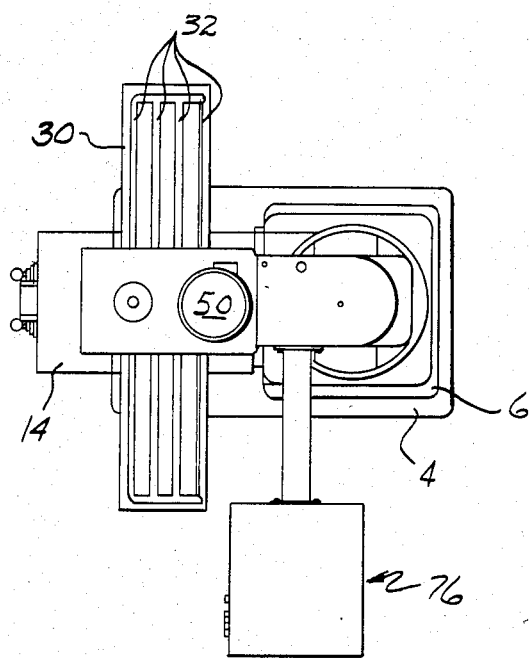
FIG. 4 is a top plan view of FIG. 3.

As described above, this invention is directed to method and apparatus for controlling the relative location and movement of a tool and a workpiece in a three-dimensional space so that the tool may perform predetermined operations on the workpiece. In the apparatus described in this application, the workpiece is secured to a table of a milling machine which table is mounted so that it may be moved in a horizontal plane along an x-axis and along a y-axis perpendicular thereto. Also, the table may be moved in a complex path by the simultaneous movement along a combined x and y axis. The tool is mounted so that its movement may be controlled in the z-axis which is perpendicular to the plane of the x-axis and the y-axis. With these controlled movements, the tool may perform work on the workpiece at any location in a three-dimensional space within the limits of the movement of the table and the tool. It is to be understood that the tool may be mounted so that it is movable in any direction within the three-dimensional space or that the workpiece may be mounted so that it is movable in any direction within the three-dimensional space. In addition to the foregoing movements, other operations may be provided, such as means may be provided to rotate the tool so as to perform an operation such as drilling. Also, means may be provided for the manual movement of portions of the apparatus.

In the embodiment of the invention illustrated in the drawing, there is disclosed a milling machine 2 comprising a base 4, a main body 6, a quill support 8 secured to the top of the main body 6 and a quill housing 10. The front face of the main body 6 is provided with a longitudinally extending support and guide 12 on which is mounted a knee 14 which is provided with a mating recess for engagement with the support and guide 12 so as to form a dovetail arrangement between the support and guide 12 and the knee 14. This arrangement permits the movement of the knee 14 up and down in a vertical plane for a purpose described below. The knee 14 is moved up and down over the support and guide 12 by a handle 16 which is connected to suitable gearing so as to turn a lead screw mounted in spaced parallel relationship to the support and guide 12 (not shown). A portion of the knee 14 comprises a precision ground ballscrews in threaded relationship with the lead screw so that rotation of the lead screw causes movement of the knee 14 up and down in a vertical plane. Suitable means may be provided so that the knee may be locked in position at any location along the support and guide 12.

Mounted on the top surface of the knee 14 is a longitudinally extending support and guide 18. A support member 20 is mounted on the support and guide 18 for movement thereover. The support member 20 is provided with a recess 22 which is provided with dove tailed surfaces to mate with dove tailed surfaces on the support and guide 18 to provide for the dove tailed arrangement 24 illustrated in FIG. 1 to guide the movement of the support member 20 back and forth in a linear direction over the support and guide 18. The support member 20 provides the movement over the y-axis. The support member 20 is moved over the support and guide 18 by a servo motor 26 which rotates a lead screw 28 which is mounted in fixed spaced parallel relationship with the support and guide 18. A portion of the support member 20 is provided with a precision ground ballscrews in threaded relationship with the lead screw 28 so that rotation of the lead screw 28 in a clockwise or counterclockwise direction causes the support member 20 to move back or forth over the support and guide 18. The relationship between the support and guide 18 and the support member 20 is such that there will be no relative movement therebetween except in response to rotation of the lead screw 28.

Figure 3:
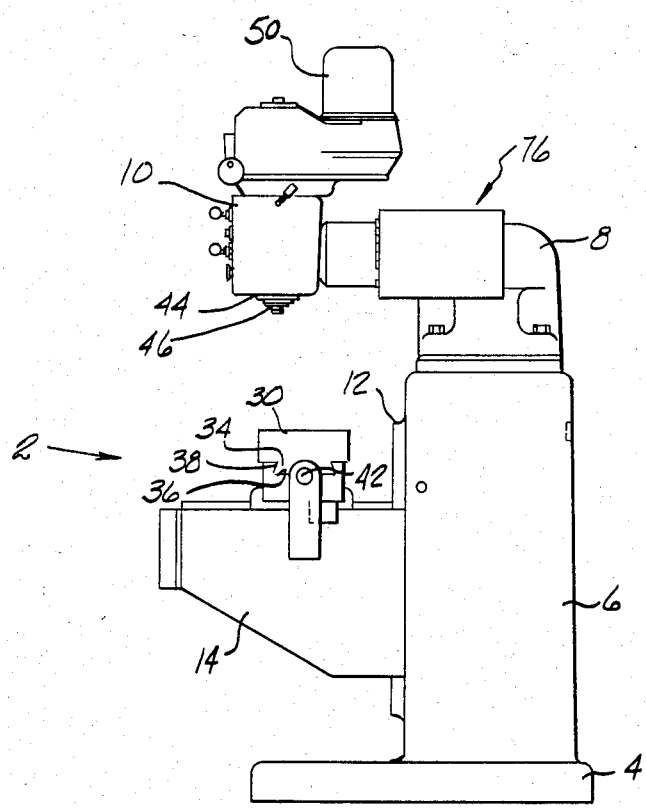
FIG. 3 is a side elevation taken from the right of FIG. 1.

A work holding table 30 is provided on its upper surface with a plurality of grooves 32, FIG. 4, dimensioned so as to receive conventional clamps so as to support workpieces at desired locations. The bottom surface of the work holding table 30 is provided with a longitudinally extending support and guide 34 which is mounted in a longitudinally extending recess 36 in the upper surface of the support member 20. The support and guide 34 is provided with dove tailed surfaces designed to mate with dove tailed surfaces in the recess 36 to provide for the dove tailed arrangement 38 illustrated in FIGS. 2 and 3 to guide the movement of the work holding table 30 left or right, as viewed in FIG. 1, in a linear direction over the recess 36 in the support member 20. This provides the movement over the x-axis. The work holding table 30 is moved over the recess 36 in the support member 20 by a servo motor 40 which rotates a lead screw 42 which is mounted in fixed spaced parallel relationship with the recess 36. A portion of the support and guide 34 is provided with a precision ground ballscrews in threaded relationship with the lead screw 42 so that rotation of the lead screw 42 in a clockwise or counterclockwise direction causes the work holding table 30 to move left or right over the recess 36 in the support member 20. The relationship between the support and guide 34 and the recess 36 is such that there will be no relative movement therebetween except in response to the rotation of the lead screw 42.

A quill 44 is mounted in a guided passageway in the quill housing 10 for vertical linear movement up and down. A tool holding bit 46 is mounted in the quill 44 so that the bit 46 moves with the quill 44 but can rotate relative thereto. The quill 44 is moved up and down in the passageway by a servo motor 48 which rotates a lead screw which is mounted in fixed parallel spaced relationship with the passageway. An extension is secured to the quill 44 and is provided with a precision ground ballscrews in threaded engagement with the lead screw so that rotation of the lead screw in a clockwise or counterclockwise direction causes the quill 44 to move up or down in the passageway. This provides the movement over the z-axis. The relationship between the quill and the passageway is such that there will be no relative movement therebetween except in response to rotation of the lead screw. A motor 50 is provided to rotate the tool holding bit 46. The connection between the motor 50 and the tool holding bit 46 is such that the tool holding bit 46 may move up and down with the quill 44 but be rotated relative to the quill 44. Such a connection could comprise a rotatable pulley mounted in a relatively fixed location and adapted to be rotated by the motor 50. A shaft would be connected to the pulley for rotation therewith and the shaft would extend into a passageway in the tool holding bit 46. A splined relationship comprising a key on the shaft and a keyway in the passageway would allow the tool holding bit 46 to slide on the shaft and the shaft to rotate the tool holding bit 46.

The milling machine 2 is designed so that one or more workpieces may be mounted on the work holding table 30 depending on the size of and the number of different operations to be performed thereon. If a plurality of operations are to be performed on a plurality of workpieces, a work holding device for each workpiece is properly secured on the work holding table and a workpiece is secured between two parallel edges of each work holding device. Each work holding device is then secured in associated grooves 32 in the work holding table 30 so that the parallel edges of each work holding device are properly oriented perpendicular to or parallel to the grooves 32. The plurality of workholding devices would be in spaced relationship. A first tool would be positioned in the tool holding bit 46 and a first programmed operation would be performed on each workpiece. The first tool would then be removed and a second tool positioned in the tool holding bit and a second operation would be performed on each workpiece. This would be repeated until all work operations had been performed.

As described above, the major control of the movement of the work holding table 30 along the x-axis and the y-axis are the servo motors 26 and 40 and the major control for the movement of the quill 44 along the z-axis is the servo motor 8. In the preferred embodiment of the invention, these servo motors comprise a permanent magnet DC servo electric motor. One motor and one tachometer assembly is used for each axis of control. As explained below, each DC servo electric motor and tachometer assembly is associated with a servo amplifier board and a motor control board. The DC servo electric motors of this invention are designed to run with a motor torque to speed ratio which is rather different from those used on other systems associated with the driving of lead screws. In the milling machine, described above, each lead screw is coupled to a belt with relatively high belt drive ratios which for the control of the work holding table 30 along the x and y axis being in the range of about 3.2 to 1.0 and for the movement of the quill in the z-axis is in the range of about 2.4 to 1.0. Conventional control systems use either direct drive or ratios not exceeding about 2.0 to 1.0. The use of the higher drive ratios means that the motor is required to develop only half the torque of conventional systems while running at twice the velocity. This permits the use of a motor of substantially reduced size so as to result in initial cost reduction and operational cost reduction.

Another significant advantage gained by using this high mechanical drive ratio is in the reduction of motor tachometer costs. The optical tachometer used with conventional direct drive motors typically contain about 2000 lines per revolution whereas the optical tachometer used with the high mechanical drive ratios of this invention require only about 500 lines per revolution. Another important advantage gained by the use of the high mechanical drive ratio system is that the servo position resolution requirement is significantly reduced which results in that a lower cost servo motor may be utilized. Another major advantage of being able to use an optical tachometer having only about 500 lines of revolution is that only an optical encoder is required for feedback to ensure stability of the velocity servo loop. Conventional motor control systems require an analog tachometer, in addition to the optical encoder, to achieve about the same degree of stability of the velocity servo loop.

The above described motors operate at relatively high DC voltage but for a fixed motor horsepower, the current required to operate the motor is reduced by the higher voltages. New high voltage power transistors in both n- and p-channel may be used and these provide significant cost savings when using low current, high voltage DC motors.

The high mechanical drive ratio, described above, is accomplished in accordance with this invention by the structure illustrated in FIGS. 5 and 6. A pulley 52 is secured to the shaft 54 of each servo motor and each pulley 52 is provided with a plurality of peripheral teeth 56. A drive cog belt 58 is trained around the pulley 52 and another pulley 60 secured to the end of a lead screw 62. As described above, each lead screw 62 is rotatably mounted in a fixed position so as to guide one of the movable elements in a path along the x, y or z axis. As illustrated in FIG. 6, the movable element is the support member 20 which has a threaded extension 64 secured thereto and in threaded engagement with the lead screw 62 so that rotation of the lead screw 62 causes movement of the support member 20. The pulley 60 is also provided peripheral teeth 66. The cogs 68 of the drive cog belt 58 are in mesh with the peripheral teeth 56 of the pulley 52 and the with the peripheral teeth 66 of the pulley 60 so that the lead screw 62 is positively driven by rotation of the shaft 54 of the servo motor. The high mechanical drive ratio of 3.2 to 1.0 is accomplished by having ten peripheral teeth 56 on the pulley 52 and thirty-two peripheral teeth 66 on the pulley 60. The high mechanical ratio of 2.4 to 1.0 is accomplished by having ten peripheral teeth 56 on the pulley 52 and twenty-four peripheral teeth 66 on the pulley 60.

An optical encoder (conventional) is associated with each of the servo motors and is used to provide feedback for the position and the velocity control. The encoder incorporates a disk having a plurality of spaced apart radially extending slots which slots terminate adjacent to the periphery of the disk. A light emitting diode is positioned so that the light will pass through each of the slots when that slot is located between the light transmitting diode on one side of the metal disk and a photo transistor on the other side of the metal disk. In a preferred embodiment of the invention, illustrated in FIG. 7, the disk 70 is made from a transparent material and the slots 72 are formed by imposing a plurality of opaque radially extending lines 74 so that the light will pass through the transparent material located between the opaque lines. The photo transistor is used to pick up the light beam and send signals to the electronic circuits, described below. As the disk rotates, a series of pulses is sent indicating the rotational velocity of the servo motor.

A second pair of a light emitting diode and a photo transistor are used to indicate the direction of rotation of the motor. This second pair is physically located so that their electrical output is 90 degrees out of phase with the first pair. Therefore, when the servo motor is rotated in a positive direction, the second signal will lag the first by 90 degrees and when the servo motor is rotated in a negative direction, the second signal will lead the first by 90 degrees. In this manner, the two pairs of optical detectors produce four signals for each slot in the disk.

While the foregoing description of the servo motors is associated with the operation of a milling machine 2, it is to be understood that servo motors of this invention may be used to control movements of a workpiece or a tool in the computer controlled operation of any type of apparatus. As stated above, the method and apparatus of this invention may be used with a wide variety of industrial or commercial equipment. In the following description of the method and apparatus of this invention, specific references will be made to the milling machine as described above and illustrated in FIGS. 1–4 of the drawing. However, it is to be understood that these references are for illustration purposes only and that the method and apparatus set forth below in this application may be used to provide robotic controls to a wide variety of machines used in the manufacture of various types of products.

The Micro-Computer Numeric Control (uCNC) system comprising the method and apparatus of this invention is a multi-axis motion control system. The uCNC system provides for robot-like execution of a complex pattern of motions. The specific machine sequence for a given application is stored on a micro-diskette. The machine sequence may be programmed on the uCNC controller or on any personal computer, minicomputer or main frame.

The uCNC system is composed of four basic building blocks: a controller, a servo box, a servo motor/tachometer, and an operator control panel. Using these four basic building blocks, a machine manufacturer may easily add robotic controls to a wide variety of industrial or commercial equipment. A significant feature of the uCNC motion control system is that the machine manufacturer can move into robotic controls without mastering the technologies of computer programming, servo dynamics or electronic design.

The heart of the uCNC system is the controller 76 in FIG. 1. The controller is actually an industrialized and specialized micro-computer. The keyboard 78 in FIG. 8 on the controller has been designed to provide simplified motion control command inputs. The computer screen 80 provides helpful commands and instructions to the machine operator. The machine control sequence is stored on a micro-diskette which is built into the controller. The built-in keyboard and screen may be used to generate and store the specific machine sequence for a given application.

The servo box located in the main body 6 contains all the motor control and servo amplifier boards required to control a number of electric motors in response to a machine sequence stored in the controller. The servo box also contains a number of auxiliary relays which may be actuated under program control.

The motor/tachometer assembly provides the actual mechanical output for the system. An optical encoder 82 is attached to the back of each of the servo motors 26, 40 and 48 and provides the required "feedback" for controlling the position and velocity of each servo motor as required by the controller 76.

The operator control panel provides for manual control by the operator. The operator control panel contains switches 84 for manually controlling the machine sequence. The panel also contains an emergency stop switch 86 to immediately stop machine motion should the operator detect an unsafe condition. The panel contains joy sticks 88, 90 and 92 for manually controlling the motion of the servo motors 26, 40 and 48.

The controller 76 contains the main computer board (not shown), the micro-diskette drive (not shown), the CRT 80 (cathode ray tube or "screen"), the CRT interface board (not shown), the keyboard 78 and auxiliary circuit board (not shown). All components are housed in an industrial grade, splash-proof, metal housing 94. The controller 76 uses the CP/M operating system running on a Z80A microprocessor operating at 4 million cycles per second. The system provides for 65,000 characters of solid state memory and 250,000 characters of disk memory. The master program within the controller is written in CB80, which has been compiled to machine language. The controller provides 300 baud serial communications for use with an external telephone modem. The controller communicates with the servo box over a multiplexed 9600 baud duplex serial interface which includes one handshaking line.

The software supplied with the controller allows the user to operate the machine in one of two basic control modes. The first mode is "PROGRAM MODE" and the second mode is "RUN MODE". In program mode and the run mode, the user may perform the operations which appear on the CRT screen opposite to the lettered keys A-F on the keyboard 78 as follows:

| PROGRAM MODE | | RUN MODE | |
| --- | --- | --- | --- |
| LOAD JOB | A | SET UP | A |
| CREATE JOB | B | AUTO | B |
| SAVE JOB | C | MDI | C |
| ERASE JOB | D | JOB | D |
| EDIT | E | | E |
| RUN | F | PROGRAM | F |

The use of these soft keys is very important to the design of the controller because the soft keys can take on many different functions with each new function displayed on the screen. This means that the controller may be designed with a very simplified key board, as shown in FIG. 8, and yet perform very complex control functions. In competitive machines the keyboards are very complex due to the large number of switches required to perform necessary control functions. This large number of switches increases the cost of the controller and makes the controller difficult to learn to use. The soft keys reduce costs by simply reducing component cost. This also increases product reliability, since there are fewer parts, there are fewer failures. The simplified keyboard also simplifies the learning process as required key functions are presented to the user only when they are active. Inactive key functions are, in effect, hidden from the user.

| LOAD JOB | | EDIT FUNCTIONS | | |
| --- | --- | --- | --- | --- |
| Enter Job | A | 1 3789 | Back | A |
| For Retrieval | B | 2 C456 | | |
| CRC DDD DEF DEFF | C | 3 B123 | Forward | B |
| FEO ABCD IP CBC | D | 4 E-8 | | |
| F | E | 5 F-14 | Display | C |
| | F | 6 ACMIR | | |
| | | 7 | Insert | D |
| | | 8 | Delete | E |
| | | 9 | Delete BLK | F |

Two of the sub-menus which may be selected from the PROGRAM mode are shown under the LOAD JOB and EDIT FUNCTIONS. If the "LOAD JOB" function is selected, the CRT screen will show the above column under LOAD JOB. In this screen, the selection of jobs available, on the current diskette, is displayed for user selection. The line at the top of the screen requests that the user enter the name of the job which is to be loaded. When this screen is displayed, the "A" through "F" keys no longer function as "soft keys", but take on their alpha functions. The shift key, in the lower right hand corner of the key board, may be used to select the alpha functions printed above each number on the keyboard. When in the "shifted" pattern, all letters of the alphabet are available for construction job names. A red light above the shift key is illuminated to inform the user that the keyboard is in the alpha shift position.

If the edit function is selected, the CRT screen will show the above column under EDIT. With this screen the user may:
1. Scroll the display up or down to examine job programs too long to fit on the screen.
2. Insert a new line into the program.
3. Delete a line from the program.
4. Modify or change a line.
5. Append to the bottom of the program.

The language used to write job programs is defined by Electronics Industries Associations standard RS-274C, identified as: "Interchangeable Perforated Tape Variable Block Format for Positioning, Contouring, and Contouring/Positioning Numerically Controlled Machines". In the industry this code set is simply referred to as MDI programming (Manual Data Input). Each instruction line in a job program instructs the machine to move to a new position, start a motor or pump, or perform a pre-defined series of operations. Various commands in the job program allow the user to instruct the machine to repeat certain cycles or enter certain modal conditions as defined in RS-274C. The operation of the controller is conventional in that the operator feeds information and the computer responds to the information.

The Controller communicates using an 11-bit byte of 1 start bit, 8 data bits, 1 even parity bit, and 1 stop bit. At 9600 bits per second, each character will transmit in 1.146 milliseconds.

The controller recognizes two types of message formats, DIAGNOSTIC MODE and COMMAND MODE. In Diagnostic Mode, each byte represents a single ASCII character, which allows an individual to control the system using a terminal.

Axis logic boards default to Diagnostic Mode. In order to recognize Command Mode messages, they must receive a Diagnostic Mode message to enter Command Mode. Once in Command Mode, the Axis logic boards will not recognize Diagnostic Mode messages unless they receive a Command Mode message to enter Diagnostic Mode or are reset.

Command Mode messages minimize communication overhead by allowing each byte to represent a binary value from 0 to 55. This prevents the use of unique start and stop bytes, so Command Mode must use other methods to identify the beginning and ending of a message.

The Controller identifies valid transmitted data by raising Data Set Ready (DSR). DSR must be low for at least one character time between the end of the previous message and the start of the next.

Since an axis logic board must receive a valid message addressed to it before it can transmit a message, the Controller regulates the spacing between received messages. A space of at least 3 character times identifies the end of one message and the beginning of another.

The longest Command Mode message is ten characters, making the maximum transmission for one message from the controller at 9600 bps = 10*1.46 = 11.46 milliseconds.

COMMAND MODE MESSAGE FORMAT

All Command Mode message use the following format:

CD ... DS where
C is the COMMAND message type and axis address
D are the DATA bytes
S is the SUM of the message

COMMAND

The Controller uses the Command code to specify the type of action that the axis is to perform, which axis the transmitted message is to go to, and where the received message came from.

The most significant digit of the command code specifies the message type. The least significant digit specifies the axis address. This allows the Command Code to specify 16 different message types to 15 different addresses; an axis address of 0 specifies a global message addressed to all axis boards.

DATA

Each message transmit data as hexadecimal bytes. Each data type uses fixed-length fields. Multiple-byte fields transmit most significant byte first, least significant byte last.

SUM

The Sum byte is the hexadecimal sum of all the characters in the message modulo 256, less the Sum byte.

The following describes a single communication inter- change:
1. The Controller raises Data Set Ready (DSR) to indicate the start of the message.
2. All axis boards detect DSR and prepare to receive a message.
3. The Controller transmits a single character during each interrupt until is has transmitted the entire message. Immediately after the last character transmitted, the Controller lowers DSR to indicate the end of the message.
4. All axis boards store each character until they detect the low DSR. At this time, they will have received the entire message, and can process the message.

If the axis detects an error in the message, it will ignore the message. The axis will detect an error through either parity, length or checksum.

If the axis receives a message with a non-zero axis address, and the address does not match the axis board's address, the axis will ignore the message.

The Controller may transmit a message to an axis at any time. No axis may transmit unless it has received a valid message addressed specifically to it. All axis boards must respond to a valid message that is addressed specifically to it, either with the requested data, or with an acknowledge. All axis boards execute global messages, but do not send a message back to controller.

Only one axis board at a time may transmit a message. In order to ensure that the controller can separate two messages, there must be at least three character times between the end of one axis board message and the start of any other axis board message.

If the Controller transmits a non-global message, it will wait a certain time for the axis to respond. It if times out, or if it receives an invalid reply, the Controller will retransmit the same message two more times. If the Controller is unsuccessful all three times, it will assume that the axis is defective, disable servo power, and display an error message on the screen.

COMMAND MODE MESSAGES

The VELOCITY message uses the following format:

CFFS where
- C is the COMMAND message type (0) and axis address
- FF is the FEEDRATE
- S is the SUM of the message The Velocity message overrides the programmed speed of the motor. The Feedrate is in units of inches per minute * 256. When an axis receives a Velocity message addressed to it, it will adjust the velocity set point of its servo to achieve the desired speed, and transmits a Verify message in response.

The CONTOUR START message uses the following format:

CPPPMBTRS where
- C is the COMMAND message type (1) and axis address
- PPP is the contour reference POSITION
- M is the contour offset MULTIPLIER
- B is the contour offset BYTE position
- T is the TORQUE limit
- R is the acceleration RATE
- S is the SUM of the message The Contour Start message signals the start of a coordinated two-axis motion. When an axis receives a Contour message addressed to it, it will store all data value and go into the state to receive an indefinite number of Contour messages.

The CONTOUR STEP message uses the following format:

CA1A2S where
- C is the COMMAND message type (2) and axis address to repond
- A1 is the contour offset for AXIS1
- A2 is the contour offset for AXIS2
- S is the SUM of the message Contour Step messages specify the distance to travel from the contour reference position for one interval of time. The controller will transmit a Contour Step message only after a Contour Start message or a previous Contour Step message.

When the controller transmit a Contour Step message, the axis boards that received the Contour Start messages will take their axis steps starting from the contour offset byte position and multiply it by 2 to the power of the contour offset multiplier, and then add it to the contour reference position. The sum is the position for that axis in absolute quarter-tach counts.

The Address defines the axis that is to respond. If the Address is zero, then no axis responds. If the Address is a motor axis, that axis will respond with its current position and status. If the Address is the Relay axis, that axis will respond with the spindle pad status, the relay status, and the feedrate override value.

The REQUEST message uses the following format:

CDS where
- C is the COMMAND message type (3) and axis address
- D is the DATA type of the request
  - 01H=position
  - 02H=velocity
  - 03H=torque
  - 04H=difference in counts
  - 05H=servo status
  - FFH=position, velocity and torque
- S is the SUM of the message If the Controller requests position (01H), the axis will return:

CDPPPS

If the Controller requests velocity (02H), the axis will return:

CDFFS

If the Controller requests torque (03H), the axis will returns:

CDTS

If the Controller requests a difference (04H), the axis will return:

CDTTS

If the Controller requests servo status (05H), the axis will return:

CDB

If the Controller requests everything (FFH), the axis will return:

CDFFPPPTS

The MOVE message uses the following format:

CFFPPPTRS where
- C is the COMMAND message type (4) and axis address
- FF is the FEEDRATE
- PPP is the absolute POSITION
- T is the TORQUE limit, from 0 to 255
- R is the acceleration RATE, from 0 to 255
- S is the SUM of the message When an axis receives a Move message addressed to it, it will accelerate to the specified feedrate and move along its axis until it reaches the specified position.

The ABSOLUTE MEMORY READ message uses the following format:

CAAAABS where
- C is the COMMAND message type (6) and axis address
- AAAA is an absolute memory ADDRESS
- B is the number of BYTES to read
- S is the SUM of the message When an axis receives an Absolute Memory Read message addressed to it, it will transmit a message containing a memory image starting from the absolute memory address for the number of bytes specified in the message. The axis will echo the number of data bytes as the first byte of data.

The ABSOLUTE MEMORY WRITE message uses the following format:

CAAAABD..DS where
   C is the COMMAND message type (7) and axis address
   AAAA is an absolute memory ADDRESS
   B is the number of BYTES to write
   D..D are the DATA
   S is the SUM of the message When an axis receives an Absolute Memory Write message addressed to it, it will store the data starting from the absolute memory address for the number of bytes specified in the message.

The RELATIVE MEMORY READ message uses the following format:

CABS where
   C is the COMMAND message type (8) and axis address
   A is a memory table ADDRESS
   B is the number of BYTES to read
   S is the SUM of the message When an axis receives a Relative Memory Read message addressed to it, it must first determine the absolute memory address to start from. The axis ROM contains the memory table. The memory table address specifies the desired entry in the memory table; an address of 0 selects the first address in the table.

The axis will then transmit a message containing a memory image starting from the selected memory address for the number of bytes specified in the message. The axis will echo the number of data bytes as the first byte of data.

The RELATIVE MEMORY WRITE message uses the following format:

CABD..DS where
   C is the COMMAND message type (9) and axis address
   A is a memory table ADDRESS
   B is the number of BYTES to write
   D..D are the DATA
   S is the SUM of the message When an axis receives a Relative Memory Write message addressed to it, it must first determine the absolute memory address to start from. The axis ROM contains the memory table. The memory table address specifies the desired entry in the memory table; an address of 0 selects the first address in the table.

The axis will then store the data starting from the selected memory address for the number of bytes specified in the message.

The SERVO message uses the following format:

CDS where
   C is the COMMAND message type (1) and axis address
   D determines whether it is a LOCK or UNLOCK message; FFH=Unlock, OOH=Lock
   S is the Sum of the message When an axis receives a Servo Lock message addressed to it, it will perform a stop and hold at its current position. When it receives a Servo Unlock message, it will remove power from the motor.

The ZERO message uses the following format:

CDS where
   C is the COMMAND message type (11) and axis address
   D defines the DATA type to zero
      01H=position
      03H=torque
   S is the SUM of the message When an axis receives a Zero message addressed to it, it will set the selected value to a zero condition. If the selected value is Torque, the axis will take its current pulse width value as the servo center point. If the selected value is Position, the axis will reset the absolute position counter to its initial value.

The ACKNOWLEDGE message uses the following format:

CDS where
   C is the COMMAND message type (12) and axis address
   C is the COMMAND code and axis address
   D determines the type of Acknowledge zero=Acknowledge, non-zero=error
   S is the SUM of the message An axis must transmit an Acknowledge message if it received a valid message addressed to it, and there is no explicitly defined response. The axis takes the axis Address and Command code from the received message.

DIAGNOSTIC MODE MESSAGE FORMAT

All Diagnostic Mode messages use the following format:

[AVNAAAADD...DDLLSS]

where
   [ is the START BYTE
   A is the DEVICE ADDRESS
   V is the VERB code
   N is the NOUN code
   AAAA is the DATA ADDRESS
   DD..DD is the DATA
   LL is the message LENGTH
   SS is the SUM of the message
   ] is the STOP BYTE

START BYTE

The "[" character defines the start of the message. Any axis in Diagnostic Mode that receives the Start Byte will store the following date into its receive buffer.

DEVICE ADDRESS

The ASCII letters from A to Z will convert to axis address 1 to 26

VERB

A mnemonic ASCII character defines the verb code; R=read and W=write

DATA ADDRESS

The axis address is the ASCII Hex address of the port or memory.

DATA

Data are always represented as a 2 ASCII Hex digit value. If the verb code is a read operation, the data specifies the number of bytes to read. If the code is a write operation, the data specifies the bytes to write.

LENGTH

The message length is a 2 ASCII Hex digit value that is the sum of the message modulo 256 of the characters between the start byte and the first checksum byte.

STOP BYTE

The "]" character defines the end of the message. This tells the receiving axis that the message is complete and should now process it.

Figure 10:
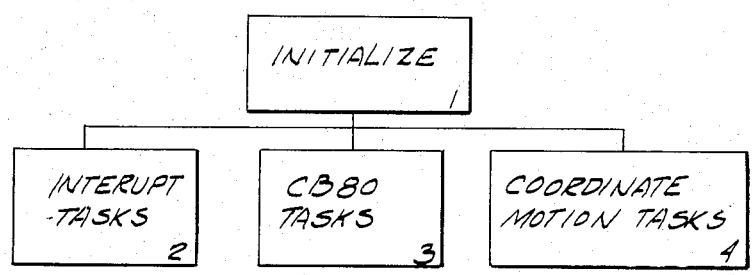

The flow charts for the software used by the controller are illustrated in FIGS. 10-17 and 20-30 of the drawings. The first chart, FIG. 10, labeled "Master Logic", indicates the general overall structure of the software. When the controller is first powered up, it first executes the initialization tasks. Following initialization the controller executes three programs concurrently. The shortest program is the "Interrupt Routines". The interrupt routines are executed once every millisecond and require approximately 0.3 milliseconds to operate so that the interrupt routines use about one-third of the processors time to execute. A "CTC" (Counter Timer Chip) is used to generate a hardware interrupt signal to the processor on fixed time intervals. Each time that this interrupt signal is generated, the processor will stop whatever it is doing and execute the interrupt service routines.

Next in level of priority to the interrupt service routines are the coordinated motion tasks. The coordinated motions program will generate a new set of coordinates each ten milliseconds. These coordinates are transmitted to the individual control servos by the interrupt service routine. Working together in this manner the controller may generate geometric shapes consisting of short, straight lines, which are produced at the rate of one hundred points per second. Both the coordinated motions tasks and the interrupt service routines are written in assembly language to ensure maximum speed of execution. If these programs were written in conventional high level language and then compiled, the execution times would be fifty to seventy times longer than the assembly language routines developed for controller.

When the controller is not executing the interrupt routines (foreground) or the coordinated motions tasks (mid-ground), the background program may be executed. The background program produces all of the displays discussed above in addition to mathematical, interpretive and data handling tasks required to convert MDI codes to servo instructions. The background program is written in a high level language called "CB80". The source code, written in "CB80", is compiled to machine language for execution on the controller.

Figure 11:
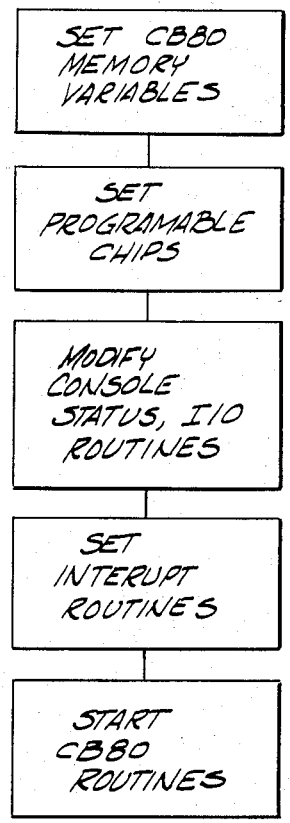

The flow charts illustrated in FIG. 11 describe the initialization tasks. The first task is to preset all of the memory variables required for execution of the "CB80" background program. The second task is to initialize all of the programmable input/output chips, such as the DART serial communications chip and the CTC counter timer chips. Third, the BIOS (basic input/output system) is modified from default console status and I/O routines to the special routines required to communicate with the controller's keyboard and CRT screen. Next, the machine language code for interrupt and coordinated motions tasks is loaded and the interrupt mechanism enabled. Finally, control is passed to the CB80 background program.

Figure 12:
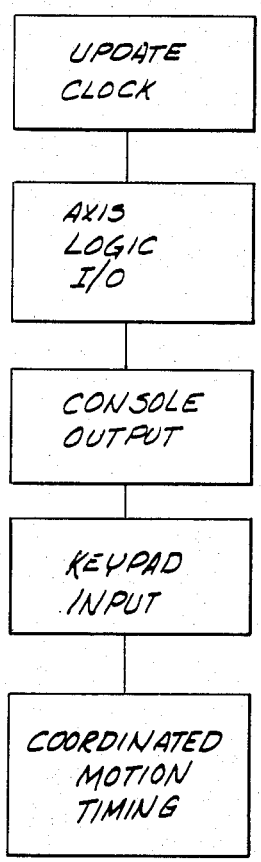

The flow charts illustrated in FIG. 12 indicate the tasks which are performed each time that the CTC generates an interrupt to the processor. The first task is to update the real time clock which is used as the master timing control for the controller. Second, the axis logic I/O tasks are performed; this is the serial communications which is multiplexed to and from the individual servo control microprocessors. The third task is to perform I/O communications to the console output; this is a separate microprocessor which controls the formatting and flow of characters to the CRT display. Fourth, the keyboard is read to detect if any key has been closed; one column of the keyboard is read during each interrupt. Finally, the interrupt routines determine if it is time to start calculating a new coordinated motions point. After this task, control is transferred to either the mid-ground or background task in progress.

Figure 13:
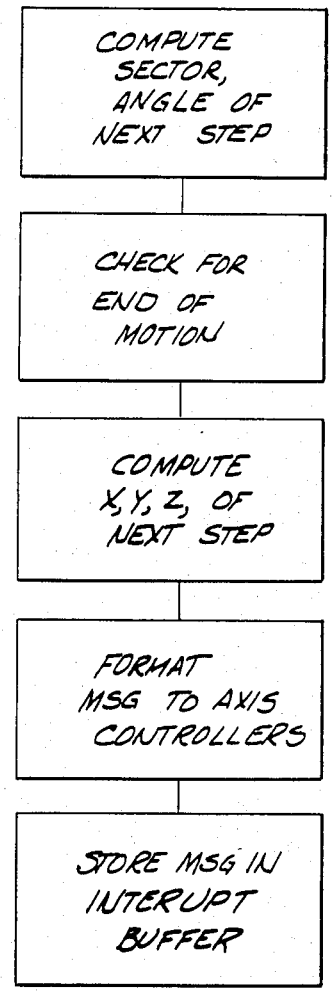

The flow charts in FIG. 13 illustrate the tasks performed by the coordinated motions tasks software. When the interrupt routine has determined that it is time to calculate a new pair of coordinated move points, control is passed to the coordinated motions tasks software (rather than back to the background software). The first task performed is to determine which sector is to be used for the current calculation. To achieve the speed required for the coordinated points calculations, the 360 degree circle is divided into eight sectors. Each individual sector is used to perform calculations within a 45 degree arc (0.7854 radians). By limiting the sector size to 45 degrees, two important objectives are achieved. First, the Fourier expansions used to calculate Sine and Cosine functions may be solved to required accuracy with only three terms in the expansion. Second, the angle term, in radians, is always a fraction ($<1$) so that a modified form of integer math may be used to solve the equations using only sixteen bit numbers. It is this unique combination of these two features which allows the controller to perform the required one hundred points per second calculation necessary to generate coordinated moves.

Once the correct sector location has been determined, the coordinated motions software will solve the expansions to calculated Sine and Cosine terms, multiply the Sine and Cosine by the radius, determine the correct X and Y (or Z) relationships, and add the polar coordinate components to pre-established offset values. Once the geometry has been solved, the software will assembly a message in the correct format for transmittal to the individual servo control axis. Finally the assembled message is transferred to the transmit buffer used by the interrupt routine for transmitting messages. Control is then returned to the background software.

Since the Z80 microprocessor is basically an eight bit processor, with some limited sixteen bit capability, it is important that the geometric calculations described above be performed using sixteen bit multiply and divide routines. The milling machine requires an accuracy of 0.0001" over a travel of 40"; or an accuracy of one part in 400,000. In binary arithmetic, the only type a microprocessor can perform, the required resolution dictates that twenty-four bit math be used for calculations. To resolve this difference, a scale factor is applied to all coordinated moves calculations. This scale factor, (1, 2, or 4) is used as a multiplier for radius and for X, Y or Z moves. Using this technique the controller may calculate circles of thirteen inches diameter to 0.0001 accuracy; or circles of fifty-two inches diameter to 0.0004 accuracy.

Figure 14:
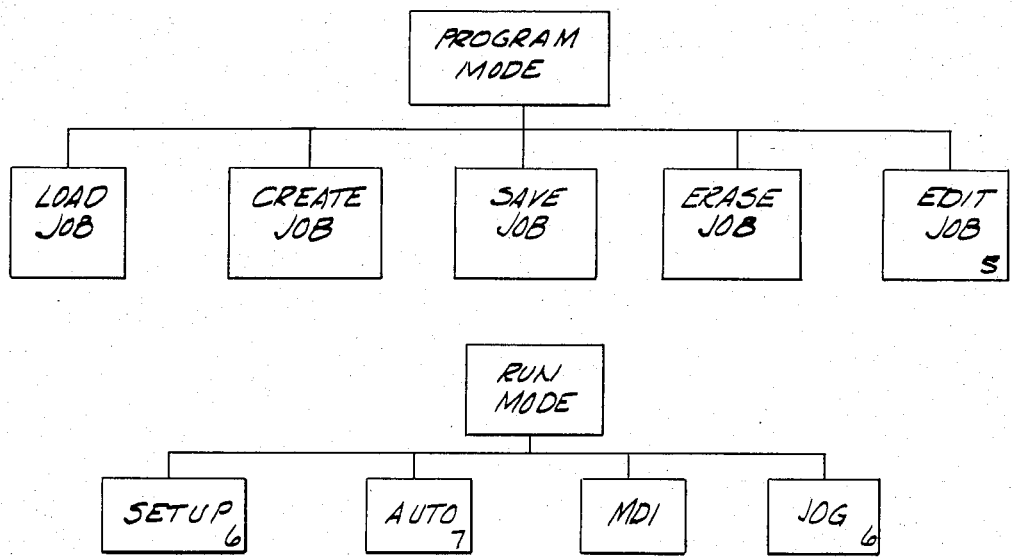
Figure 15:
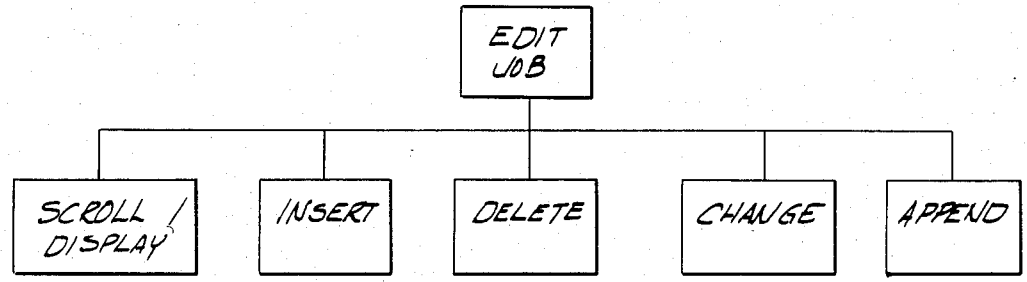
Figure 16:
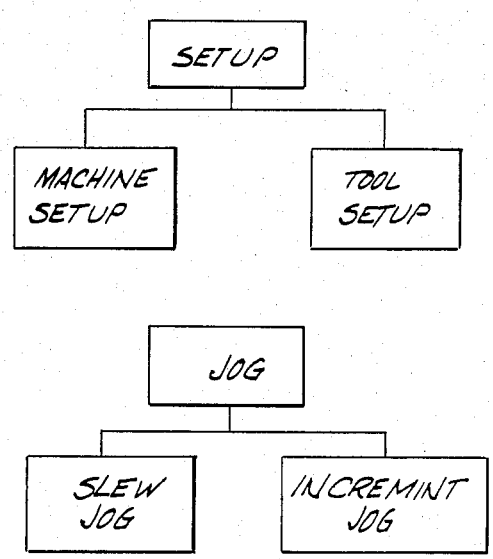
Figure 17:
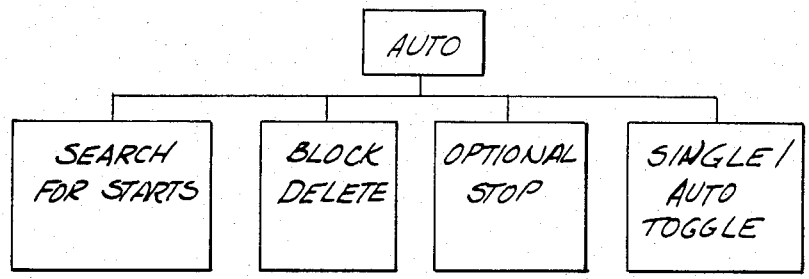

The flow chart in FIG. 14 illustrate the structure of the CB80 background tasks. The structure of this flow chart follows the structure described in the display screen section above. The flow chart for the edit function is shown in FIG. 15. FIG. 16 shows the flow charts for the "set-up" and "jog" functions. FIG. 17 shows the flow chart for the auto-execute functions. In the case of these latter three functions the CB80 software is also performing the real time job of maintaining the X, Y and Z positions displays in three locations on the screen.

The controller's monitor is a 12" black and white CRT with a 12 mHz bandpass. The controller keyboard is a custom configuration designed specifically for motion control work using ANSI standard MDI data commands. The keyboard is scanned using a row/column matrix. The scan is under software control using electronic logic located on the auxiliary board. The auxiliary board also contains the multiplexer which directs 9600 baud serial commands and responses to the CRT controller board or 300 baud commands and responses to the external modem port. An optoisolator located on the auxiliary board is wired in series with the two emergency stop switches. This isolator allows the computer to simultaneously disable all servo motion and to open all power relays (stopping all external motors).

The CRT control board has its own microprocessor and display memory. The microprocessor is a special modification of an 8048 processor which contains dedicated hardware for video clock, character generation and video dot shifters. This CRT controller allows for a wide variety of video attributes such as blinking, enhanced, double wide and double high characters. These attributes may be mixed at random within a common screen image. The CRT controller contains two 2048 word memories, one for character storage and one for attribute storage.

The micro-diskette drive uses 3.5 inch hard shell diskettes. These diskettes are of convenient size such as to fit in a normal shirt pocket. The hard shell of the diskette provides a high degree of mechanical protection for the data storage media. A metal "window" covers the read opening in the diskette for further data protection. Each single sided diskette may store 250,000 characters of formated information. Approximately 50% of this storage space is available for user program storage (a user program is a specific sequence of machine motions). This storage space is equivalent to over 1000 feet of punched tape program. The second 50% of the diskette storage area is used by the master operating programs.

The controller contains internal voltage regulators to produce required 5, +12 and −12 volts for logic, display and communications. The regulators receive unregulated power from the power box. The −12 volt supply is generated by an inverter from the +12 supply.

The servo box contains the individual motor controls, relays and all power supplies. Each servo motor is assigned a motor control board and a servo amplifier board. The motor control board receives commands from the controller, indicating the desired position and velocity for the servo motor. These commands are in the form of a serial data stream as defined in the Communications Protocol. The motor control board also processes signals from the servo motor optical encoder (tachometer). By comparing commanded position and velocity to actual values, the motor control board may generate corrective commands to the servo amplifier board.

Each motor control board is actually a miniature computer. The heart of the board is a Z80A microprocessor (U5) FIG. 18, operating at 4 million cycles per second. The microprocessor is supported by 4048 words of program storage (U3), 2024 words of RAM memory (U4) and an industry standard 8251 UART for serial communications (U8). The microprocessor is operated in interrupt mode with communications, velocity count read and PWM generation in the foreground. A unique midground cycle is used to process velocity and position servo data. The conventional background mode is used for all other processing work load. The motor control software algorithm is encoded in assembly language source code for maximum processing thru-put.

The motor control board commands the servo amplifier over a single control line. This signal is processed by an opto-isolation chip, OIC FIG. 18 D, to ensure that electrical noise generated in the motor does not communicate into the logic signals of the microprocessor. The servo box is further divided into two compartments with a metal EMI (electromagnetic interference) barrier between sections to further reduce motor noise coupling.

The single amplifier control line encodes motor control commands using a protocol in which commanded motor current is proportional to the width of pulses on the line. The pulse width modulation (PWM) is updated 5,000 times per second by the microprocessor. A Z80 CTC (counter timer chip −U1) FIG. 18 D, is used to generate a non-maskable interrupt (NMI) each 200 microseconds (5,000×200 uSec=1 Sec). Channel "0" of the CTC is programmed in timer mode. The CTC is clocked at mHz and has a prescaler of 16 on the timer. A count of 50 is loaded into channel "0" to generate the NMI signal each 200 microseconds (16×50/4 Mz=200 uSec).

Each time that the microprocessor receives a non-maskable interrupt, it loads channel "1" of the CTC with a count which is proportional to the pulse width desired. Channel "1" is clocked at 1 mHz. A 50% duty cycle is obtained by loading channel "1" with a count of 100. (Note: under PWM protocol a 50% duty cycle represents a null command to the motor.) At the start of each non-maskable interrupt the microprocessor presents the PWM flip-flop (LS393-U15) by pulsing the "PWM∅" line. To preserve foreground time this pulse is generated by addressing non-existent memory at address "E000h". The memory address decoder chip, LS138 (U16), FIG. 18B, then produces a negative pulse on the line "PWM0". Channel "1" will produce a pulse when the present time is complete. This pulse is used to reset the PWM flip-flop, thereby generating the desired pulse width modulated signal.

The microprocessor also performs character transmit or receive during the interrupt time. The controller communicates with the motor control boards using a 9600 baud serial signal. The data character is 8 bits long, plus start, parity and stop bits for a total of 11 bits per character time. Each character time is therefore 11/9600 or 1.14 milliseconds long. To conserve foreground time, the microprocessor will attempt to either transmit or receive a character every other interrupt (0.8 milliseconds per attempted transmit or receive). Using this procedure, the interrupt processing time averages 100 microseconds (or 50% of the microprocessor time is spent in foreground and 50% in background).

Motor position and velocity are derived by the microprocessor using signals from a three phase optical encoder. Two phases are used to generate "up" and "down" count pulses for each quarter tachometer line of motor rotation. These count pulses are generated, FIG. 18 C, by a LS175 flip-flop (U12) and a LS153 decoder (U13). The pulses are then fed into a CTC for microprocessor interface. "Up" counts are fed into channel "0" of the CTC (U2). Overflow from channel "0" is used to clock channel "1" to provide a 16 bit "Up" count. "Down" counts are fed into channel "2" of the CTC. Overflow from channel "2" is used to clock channel "3" to provide a 16 bit down counter. The microprocessor will then process the difference between channels "0" and "1" and channels "2" and "3" as the current position location.

The optical encoders used have 500 tachometer lines per revolution. The position determination achieved by the microprocessor is accurate to one quarter tachometer, or 2,000 quarter tachometer lines per revolution (0.18 detrees per count). If this motor were coupled to a metal working milling machine have a lead screw pitch of 0.2 inch per revolution and a motor drive ratio of 3.2 to 1, each quarter tachometer would represent 31 millionth of an inch of motor.

Figure 19:
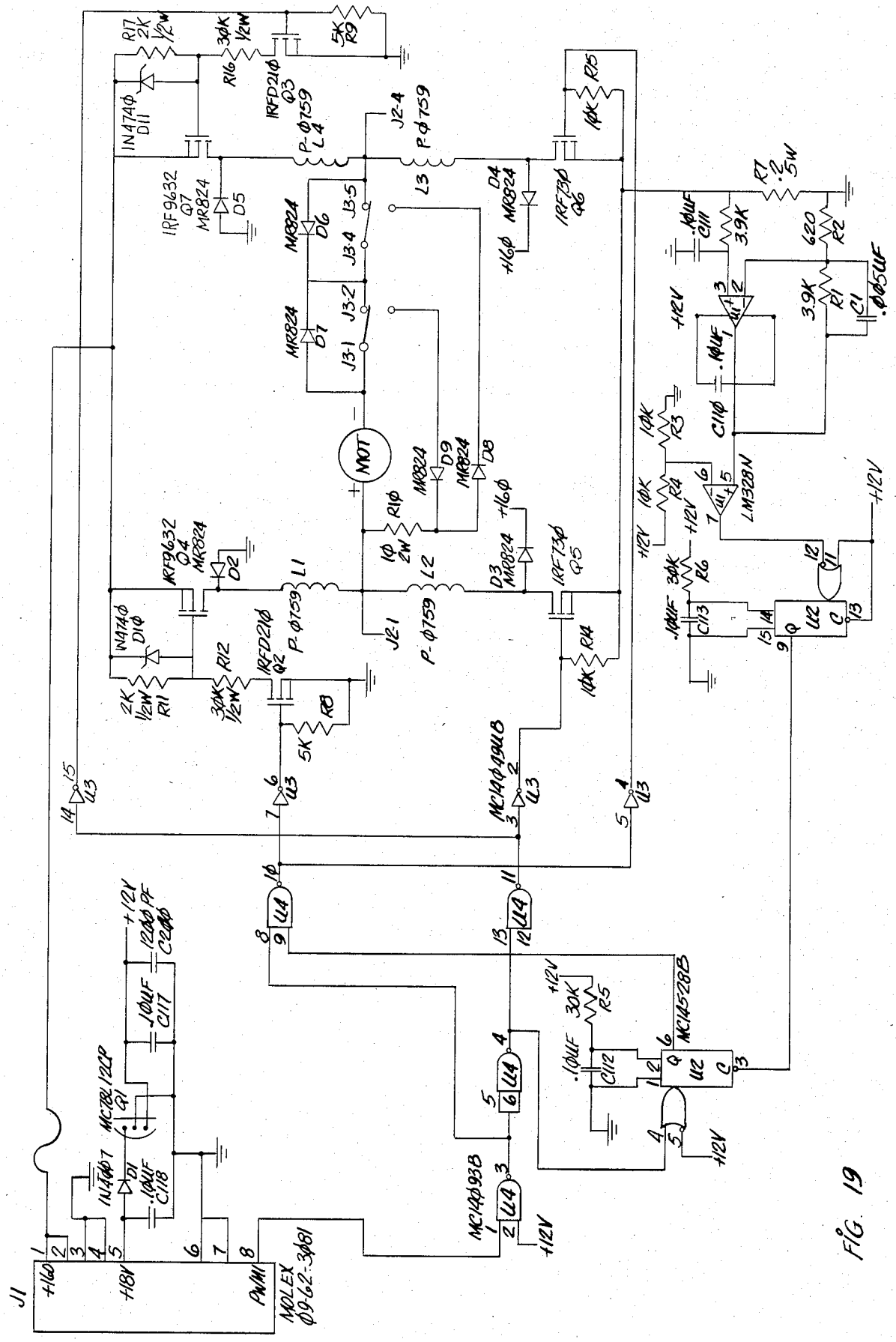
FIG. 19 illustrates the circuit of each servo amplifier.

Motor velocity is determined by measuring the elapsed time between tachometer lines. Channels "2" and "3" of a CTC (U1) are used to accumulate the number of clock pulses between tachometer lines. A "NAND" gate (U11), FIG. 19, is used to gate 2 mHz clock pulses into channel "2" of the CTC. Overflow from channel "2" is used to clock channel "3", forming a 16 bit velocity counter. The "NAND" gate allows clock pulses to pass when the output of LS151 (U14) multiplexer is "high". When the output of the LS151 is low the clock pulses are inhibited and the microprocessor may read the velocity count from the CTC. The microprocessor determines the correct read "window" by observing the polarity of the signal "VELCNT". The number of clock counts per tachometer line is then divided into the constant "3,840,000" to arrive at a reference velocity unit.

In the milling machine example described above, assume that the table is moving at 15 inches per minute. This is 0.25 inches per second. Since each tachometer line represents 125 millionths of an inch (4×31.25) this represents 2,000 tachometer lines per second, or 0.5 milliseconds per tachometer line. Using the 2 mHz clock the CTC will then accumulate 1,000 counts during the period of one tachometer line. By dividing this 1,000 counts into the constant 3,840,000 the reference velocity of 3,840 units is obtained. This number (3,840) is the computer command used to obtain an output velocity of 15 inches/minute. To simplify computer program function, all velocity commands are multiplied by two to the eighth power (256). Therefore, 15 inches per minute becomes 15×256 or 3,840 units in computer compatible notation.

In the milling machine example, it is important to achieve motor control velocities over the range of 4 to 200 inches per minute. Using the mathematics presented, above the processor must read velocity updates every 1.9 milliseconds at 4 inches per minute and every 37 milliseconds at 200 inches per minute. The velocity count read occurs in foreground which is executed each 200 microseconds. Therefore, it is not possible to read velocity counts updates which occur more frequently than every 200 microseconds. To solve this problem a tachometer line divider, LS393, (U15) and multiplexer, LS151 (U14), are used to select variable tachometer periods which are compatible with the non-maskable interrupt. Control lines "MUXA", "MUXB" and "MUXC" are used to select multiplexer output for the "NAND" gate.

The servo amplifier uses the pulse width modulated (PWM) mode of control. Under PWM control, current is continuously reversed across the servo motor leads. The proportionate amounts of time in each direction determine the net power delivered to the motor. When the switching times are equal, the motor receives no net power and therefore it does not move. This mode of control provides for minimum power loss in the amplifier, minimum component cost and minimum package size.

The servo amplifier board, FIG. 19, incorporates a number of safeguards to protect the motor and the amplifier. The PWM signal from the motor control board is monitored by a "watch dog" circuit which will automatically shut down the amplifier if the PWM pulse train does not exhibit certain predetermined parameters. A second protective circuit monitors the current flowing through the motor and will turn the amplifier off if current exceeds parameters determined by a specified current/time map. A unique inductive loading technique has been built into the amplifier which prevents the common problems of "H" bridge short circuit due to phased switching delays. The inductors also prevent the destructive effects of amplifier ringing due to interaction between parasitic motor lead capacitance and motor inductance.

The current flow through a motor which is not turning (locked rotor) may be related linearly to the percentage of pulse width. For a given motor a pulse balance of 35% in one direction and 65% in the opposite direction may cause full rated torque to be developed by the motor. When this same motor is turning at full rated speed it may require a pulse balance of 20% over 80% just to maintain motor speed with no current flowing in the armature. To compensate for this effect, the microprocessor will correct for motor velocity (back emf) by using correction formulas built into the microprocessor program. This is done by calculating the pulse percentage required to turn the motor at its actual velocity and then adding (or subtracting) the current balance to (from) the velocity percentage.

The supply voltage used to control the motor must be sufficient to provide for motor back "emf" (electromotive force) at maximum motor velocity. In the milling machine motor example, the motor must turn at 3200 RPM to achieve 200 inches per minute. The motor back emf produces 27 volts per thousand RPM, or 86 volts at 3200 RPM. To achieve adequate motor control the supply voltage is set at 160 VDC. This supply voltage is generated by full wave rectifying the 115 VAC power mains.

The PWM mode of control requires an inductive load to regulate current flow through the power transistors and motor. At the null condition the motor will have current flowing in a first direction for 100 uSec and then in the reverse direction for 100 uSec. A typical motor inductance, for a DC servo motor, which may be used in the milling machine example cited above, would be 5 millihenries. If 160 volts is placed across 5 mH for 0.1 milliseconds the current in the inductor will increase by 3.2 amperes. This is an unacceptably large amount of current flow for the null condition, resulting in excessive motor heating, oversize drive transistors, power loss and excessive audio noise in the control system. To limit these undesirable effects, the motor inductance is supplemented by external chokes to increase circuit inductance to approximately 15 mH. This three times increase in inductive loading will reduce the null current change from 3.2 amps to 1 amp, a more acceptable value.

One of the most difficult performance parameters to achieve in a position control servo system is to maintain the motor in a given position with no motion, the "stop lock" mode of operation. This parameter is aggravated if the mechanical load includes a great deal of friction, as in the milling machine example. The DC servo motor has inherent damping characteristics which may be invoked if the motor circuit is closed. If the motor leads are "open" this damping is lost. As explained above, the PWM control technique used, in the uCNC system, maintains a constant flow of current through the motor. The uCNC system therefore takes advantage of the natural damping characteristics of the DC servo motor.

The placement of the compensating inductors, in the uCNC system, is highly unique. The desired inductance is distributed around four chokes such that either of two pairs provides the desired inductive compensation. As shown in the servo amplifier schematic, FIG. 19, these chokes are placed in each leg of the "H" style motor drive amplifier.

In operation, motor current flows first from the 160 VDC source through power transistor Q4, choke L1, the servo motor (positive direction), choke L3, and finally through power transistor Q6 to the 160 VDC return. In the second half of the cycle current flows from the 160 VDC source through power transistor Q7, choke L4, the servo motor (negative direction), choke L2, and then through power transistor Q5 to the 160 VDC return. Note that for each path the inductive load is 15 mH; 5 mH for the servo motor and 5 mH for each of the two chokes. As the cycle reverses the motor current reverses providing a net null current, and torque, within the motor. However, because current is always flowing through the motor, the natural damping characteristics of the motor are invoked.

The current flow through chokes L1, L2, L3 and L4 does not reverse each half cycle. The current induced into L1, during the first half of the cycle, continues to flow during the second half of the cycle (this is a property of an inductor). The source of this current is the 160 VDC source in the first half of the cycle. During the second half of the cycle the source of current is the 160 VDC return, via diode D2. The same argument applies for the inductor L2. In the case of L2 the current passes through power transistor Q5 for the second half of the cycle and through diode D3 during the first half of the cycle. If any junction between a power transistor and diode pair were observed, Q4 and D2 for example, the voltage would first commutate from the 160 VDC source and then to the 160 VDC return. To facilitate this commutation the diodes feature very fast reverse recovery characteristics. This means that when the voltage is reverse across the diode, such as to swing from blocking to conducting, the diode will recover from the reverse blocking condition in a fraction of a microsecond.

The percentage of time for which each side of the amplifier is conducting is determined by the PWM control command from the motor control board. This signal passes through a high band pass opto-isolator and is processed by CMOS logic on the servo amplifier board. Power for the CMOS logic circuitry is regulated on the servo amplifier board by a 78L12, +12 volt, regulator (Q1). The raw power supplied to this regulator passes through a high voltage diode (D1). Should a power transistor failure occur on the servo amplifier board it is possible that the 160 VDC will appear on the 12 volt supply. The purpose of the high voltage is to block this failure from causing failures on other servo amplifier boards.

The PWM signal is first processed by a series of four "4093" "NAND" gates (U4). These gates have Schmitt trigger inputs to provide high noise immunity for the PWM signal. The first gate (output 3) provides a buffer for the signal coming from the opto-isolator. The second gate (output 4) provides for one stage of inversion. This inversion is required because complementary signals are required to run the opposite sides of the "H" bridge amplifier. The third gate (output 10) and fourth gate (output 11) provide for the ability to shut down the servo amplifier in response to detected failure conditions. When pins 9 and 12 are pulled low the PWM signal is inhibited from turning on either side of the "H" bridge.

The output of the third "NAND" gate (pin 10) is used to control two "4049" gate drivers (U3). These gate drivers control the flow of current through the positive side of the "H" bridge. Input at gate driver pin 5 generates the gate control signal required for power transistor Q6. When the gate of Q6 is high the transistor (a n-channel power MOSFET) will be conducting. Input at gate driver pin 7 generates the controls signal required to transistor driver Q2. When the gate of Q2 is high the transistor (a n-channel MOSFET) will be conducting. This will cause the gate of transistor Q4 to drop 10 volts below the 160 VDC supply. The voltage at the gate is limited by zenier diode D10. This drop in gate voltage will cause Q4 (a p-channel MOSFET transistor) to conduct. With both Q6 and Q4 conducting, current will be induced to flow through the servo motor in the positive direction. During this time transistors Q5 and Q7 are held in their non-conducting states.

The output of the fourth "NAND" gate (pin 11) is used to control two "4049" gate drivers. These gate drivers control the flow of current through the negative side of the "H" bridge. Input at gate driver pin 3 generates the gate control signal required for power transistor Q5. When the gate of Q5 is high the transistor (a n-channel power MOSFET) will be conducting. Input at gate driver pin 14 generates the control signal required to transistor driver Q3. When the gate of Q3 is high the transistor (a n-channel MOSFET) will be conducting. This will cause the gate of transistor Q7 to drop 10 volts below the 160 VDC supply. The voltage at the gate is limited by zener diode D11. This drop in gate voltage will cause Q7 (a p-channel MOSFET transistor) to conduct. With both Q5 and Q7 conducting, current will be induced to flow through the servo motor in the negative direction. During this time transistors Q4 and Q6 are held in their non-conducting states.

Overtravel limit switches are provided to limit travel in each direction of motion. These limit switches interrupt current flow to the servo motor such as to prevent mechanical damage to the machine as a result of excessive motion past predetermined limits. The positive motion limit switch is connected at J3-4, 5 and 6. In normal operation this switch is closed across contacts J3-4 and 5 allowing motor current to flow unrestricted. If the positive limit switch is actuated, as a result of excessive motion in the positive direction, this switch will open the connection at J3-4 and 5 and close the connection at J3-4 and 6. Current steering diode D6 will block the flow of current in the positive direction. At the same time current steering diode D8 will allow motor current to, in the negative direction, between the servo motor and braking resistor R10, thus dynamically braking the servo motor using the motor's internally generated back emf to generate the braking energy.

The negative motion limit switch is connected at J3-1, 2 and 3. In normal operation this switch is closed across contacts J3-1 and 2 allowing motor current to flow unrestricted. If the negative switch is actuated, as a result of excessive motion in the negative direction, this switch will open the connection at J3-1 and 2 and close the connection at J3-1 and 3. Current steering diode D7 will block the flow of current in the negative direction. At the same time current steering diode D9 will allow motor current to flow, in the positive direction, between the servo motor and braking resistor R10, thus dynamically braking the servo motor using the motor's internally generated back emf to generate the braking energy.

To assure continued operation of the servo amplifier the pulse train into the amplifier must be continuous and at the correct frequency. If the pulse train were to stop (through a fault in the microprocessor, it's program, or component failure) a watch-dog circuit will shut down the amplifier. The PWM signal is fed into a mono-stable monovibrator 4528 (U2) at pin 4. The time constant for the multivibrator is set to 3 milliseconds. If output of the multivibrator (pin 6) will be held high as long as the PWM signal changes state at least every three milliseconds. If the PWM signal should fail to have two raising edges within 3 milliseconds, the output of the multivibrator will drop and inhibit the PWM signal from passing the "NAND" gates at U4 pins 10 and 11. The polarity of outputs at pins 10 and 11 is such that both sides of the "H" bridge will be disabled.

A current sense resistor, R7, is used to sense current flow conditions in the servo motor. The current in the sense resistor is the current flowing through the servo motor only. The current flowing through the inductors on the non-conducting side of the "H" bridge is sourced through clamp diode D2 (or D5) and sunk through clamp diode D4 (or D3). Thus the free wheeling current is not included in the current measured at the sense resistor R7. The voltage sensed at R7 is amplified and filtered by operational amplifier U1 (pins 5, 6 and 7). There are two RC filters for this amplifier. The input filter (C111) provides a 4 millisecond time constant on the amplifier input. The feedback filter (C1 and R1) provides a 4 millisecond time constant for the feedback.

The amplifier gain is determined by the feedback resistor R1 and the ground reference resistor R2. The gain of the amplifier stage is (R1+R2)/R2 or 7.3. The amplifier input is 0.2 volts/amp giving an overall gain of 1.46 volts/amp. If the servo motor current limit is set to 4 amps, then the desired set point for the comparator (formed by operational amplifier U1, pins 1, 2 and 3) is 5.84 volts. This set point is determined by the resistor pair R4 and R3. The output at pin 1 is fed into a monostable multivibrator (U2) at pin 12. A falling edge at pin 12 will cause the multivibrator to produce a 3 millisecond (determined by R6 and C113) low pulse at pin 9. This low pulse is used to inhibit (clear) the watch-dog multivibrator and thus disable the "H" bridge for 3 milliseconds.

Coordinated moves required that two axis move at the same time. The uCNC system performs coordinated moves by issuing pairs of position points at a rate of 100 pairs per second. The servo amplifier and motor serve to smooth these discrete points such as to produce a smooth output motion.

The servo control software is written in assembly language, translated to machine language, and stored on the motor control board using a standard 2764 (8k×8) EPROM. The servo control software controls the position and velocity of the servo motor, communicates bi-directionally with the controller, performs internal diagnostics and self-calibration function. There is one copy of software installed on each of the three motor logic boards. Each axis of the machine requires a different version of the software to compensate for differences in mechanical drive configuration and certain load inbalances. These differences are down loaded from the controller at initialization time.

Figure 20:
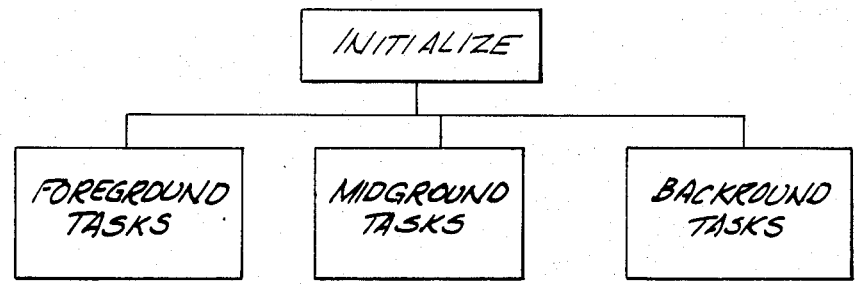
Figure 18A:
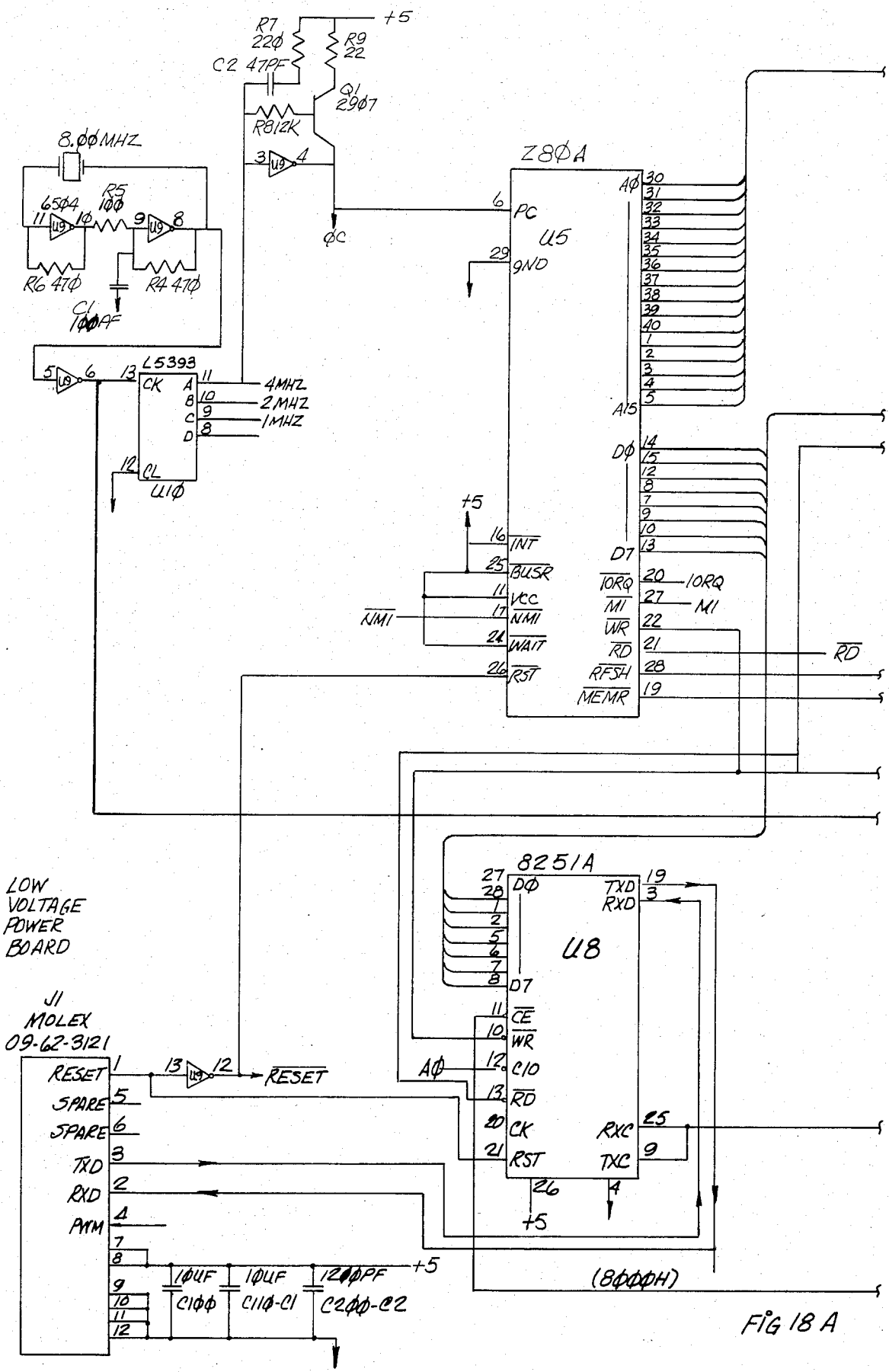
FIGS. 18a-d illustrate the circuits on each of the motor control boards.
Figure 18B:
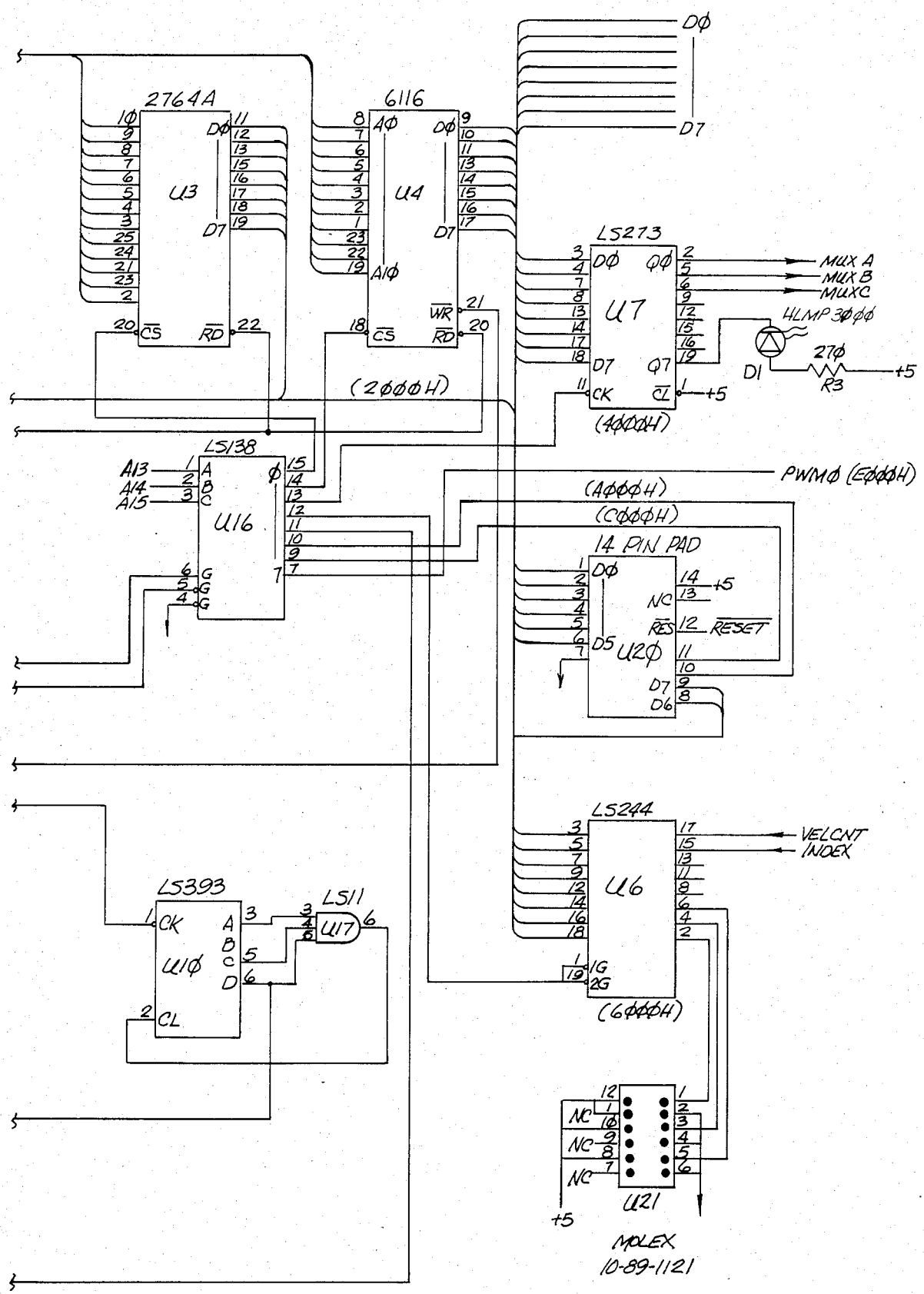
Figure 18C:
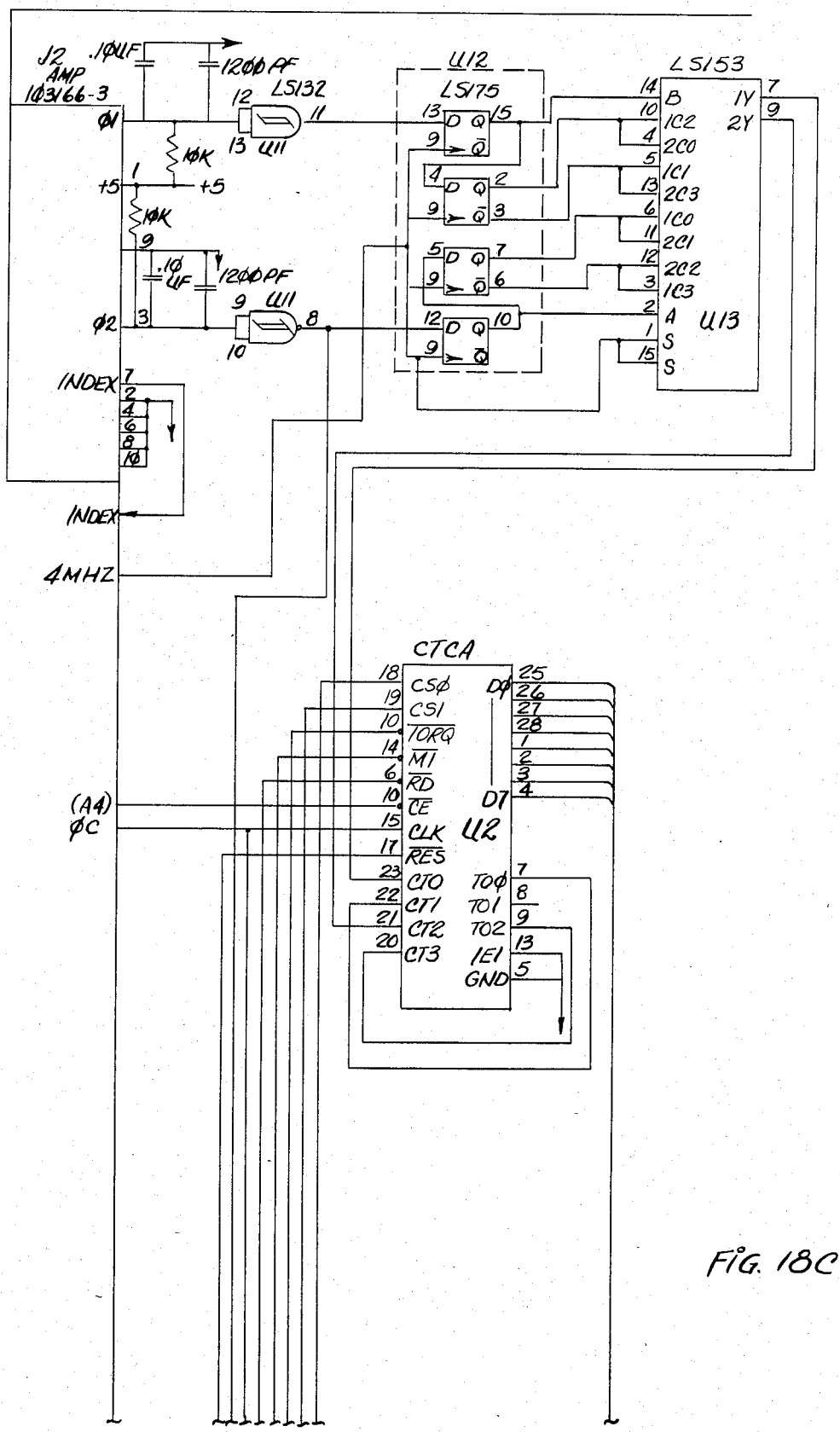
Figure 18D:
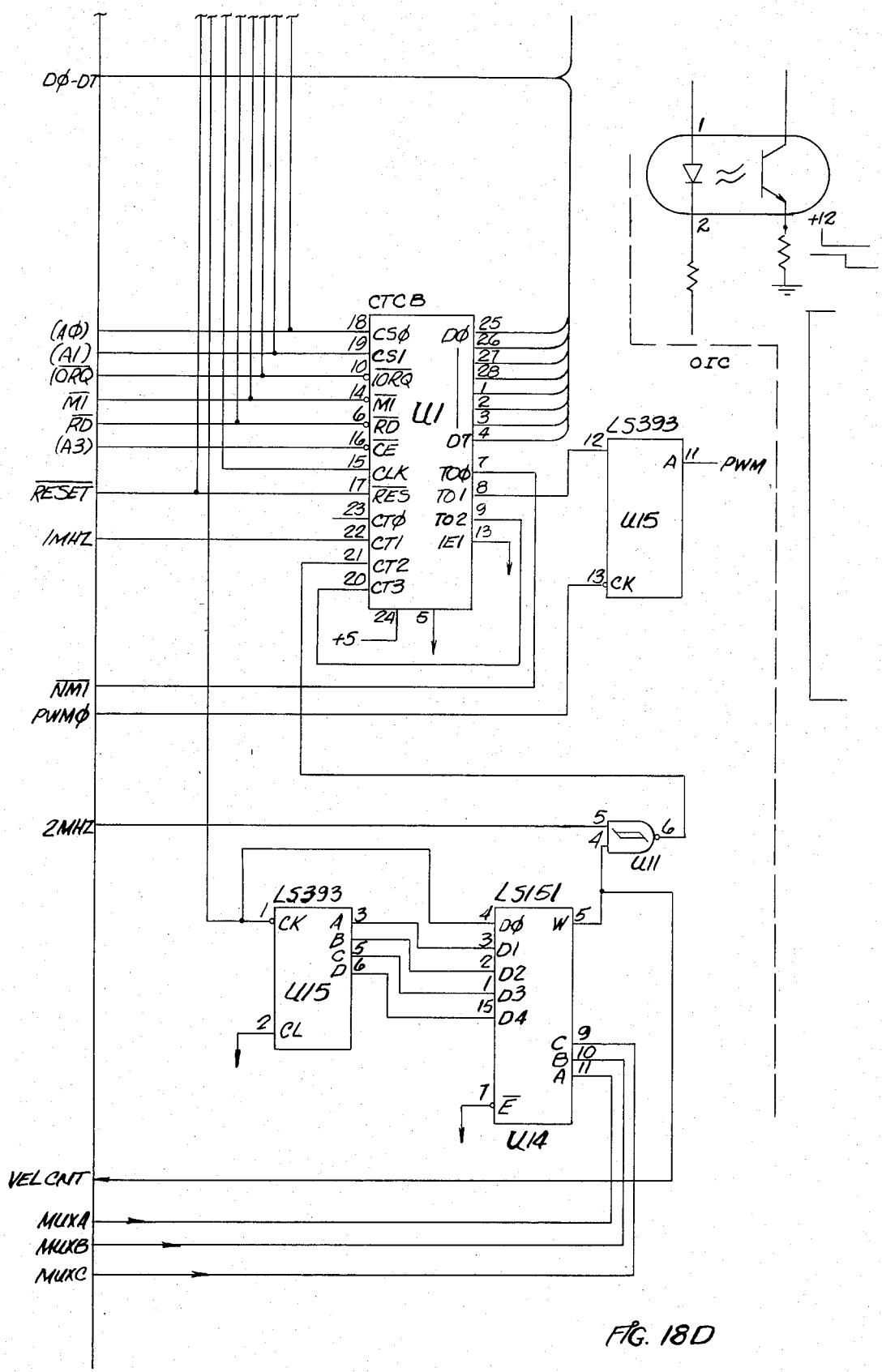

The flow charts for the servo control software are illustrated in the drawing. FIG. 20 shows the overall structure of the program. First, upon power up, the program will execute certain initialization routines. After initialization, the processor will execute three programs. concurrently. When the processor receives a non-maskable interrupt, every 200 microseconds, the foreground tasks will be executed. Between interrupt cycles the processor will execute either the midground or the background routines. The background program consists of several segments which are alternately executed between midground routines. This alteration between midground and individual background tasks ensures that the midground routines will execute every three to four milliseconds. The background routines are adjusted to equal amounts of execution time so that the midground will repeat on regular intervals.

Figure 21:
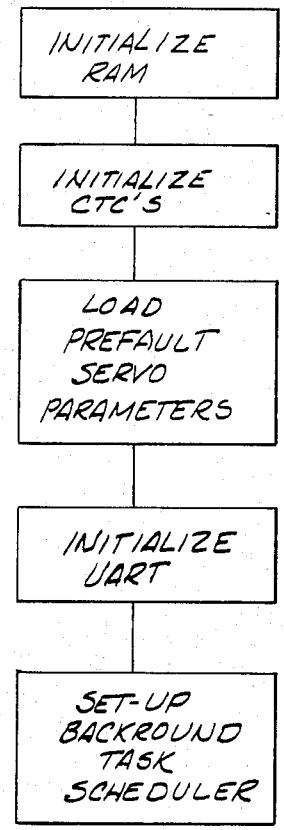

FIG. 21 of the flow charts illustrates the initialization tasks. The first task performed in RAM initialization. During this task the read/write memory is preset to contain constants and initial values required for execution of the remainder of the program. Unused RAM, Random Access Memory, area is initialized to zero value. The stack pointer is also initialized at this time. The second task is to initialize the CTC's (Counter Timer Chips) to operate as described above. The CTC's are initialized by writing commands into control registers associated with each channel of each CTC. Third, the initial default servo parameters are loaded into RAM registers used to control the dynamics of servo control. It is these registers which give the servo unique knowledge of a specific control axis. Later during the initialization, these registers will be over written by the controller to refine the control capabilities of the servo. Fourth, the 8251 UART serial communications port is initialized to communicate with the controller using the protocol specified in the communications specification. Finally, the background task scheduler is programmed to indicate the order in which background tasks are to be performed.

Figure 22:
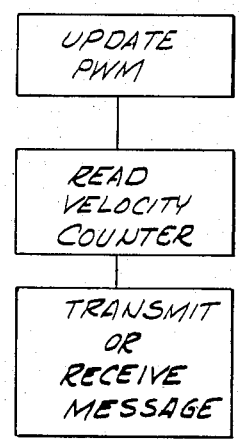

FIG. 22 of the flow charts illustrates the foreground tasks to be performed by the processor. As described above, the processor is interrupted every 200 microseconds by a time which actuates the NMI (non-maskable interrupt) pin. These interrupts, every 200 microseconds, are used to generate the 5,000 cycle per second PWM signal which gates current to the servo motor. The first task performed, when interrupted, is to save the microprocessor internal registers and the address of the next program step to be executed. Second, the processor updates the PWM duty cycle by clearing the PWM counter, loading the new count value, and restarting the PWM counter.

The third interrupt task is to read the velocity counter. The velocity counter is a sixteen bit counter which is clocked by the phase encoder signal as described above. The velocity count must be read during the time in which the clock is inhibited by the encoder signal. The processor may determine if the counters can be read by testing the encoder signal. If the line is low, the counters may be read. If the line is high, the counters are active and may not be read. After the counter is read, the encoder signal is re-read to ensure that the counter did not start during the read phase. (The encoder signal is actually multiplexed as described above.) The velocity counter is read in two eight bit reads. These reads are assembled into a sixteen bit register within the processor. The previous velocity counter is fetched from memory (RAM) and subtracted from the new reading. If the difference is the same, the velocity counter has not been updated since the last reading. In this case, the reading is ignored. If the difference is non-zero then the count has been updated and the difference now represents the number of clock cycles between tachometer lines.

The third, and final task of the interrupt program is to process communications from or to the controller. As the UART is set to operate at 9600 baud, it is possible to transmit or receive one character each 1.1 milliseconds. To ensure that no characters are lost, the interrupt routine may either transmit or receive a character every four interrupts (0.8 milliseconds). The communications routines are therefore divided into four sections, one section is executed every interrupt time. In the first section the receive channel of the UART is tested to determine if a character has been received. If a character has been received, the character is loaded into the receive buffer in the RAM. If the character is the last character of a message string, the error flags of the UART are tested for transmission errors which may have occurred within the message. If any errors have been detected by the UART, (parity, overrun, underrun, etc.) the error condition is reported to background so that the message may be rejected. After each character is received the receive buffer pointer is advanced. Next the pointer is tested for excessive message length. The next section of the communications is a null; no program is executed (in order to conserve processing time). The third section provides for character transmission. The program first tests to determine if there is a character to be transmitted in the transmit buffer (in RAM). If there is a character, the UART transmitter is next tested to determine if it is empty. If the transmitter is empty, the character is loaded into the transmitter and the buffer character pointer is advanced. The fourth, and final, task is another null.

The entire interrupt routine has been carefully designed to ensure that the interrupt processing time is less than 100 microseconds. This ensures that fifty percent of the processing time is available for midground and background software.

FIG. 23 of the flow charts illustrates the midground tasks to be performed. Midground tasks are associated with the velocity servo and must be processed every three to four milliseconds to ensure adequate phase margin for the velocity servo (mechanical time constant approximately twelve milliseconds). First, the feedrate override flag is tested to determine if a feedrate (commanded velocity) correction has been received. If a feedrate correction has been received, then a recalibration flag is set. Otherwise, the recalibration flag is not altered. Next, the current, actual velocity is calculated. Velocity is calculated by dividing the velocity count into a constant as described above. At this point a decision must be made. If the servo has been commanded to stop lock (to stand still) the program will branch to the stop lock calculations. If the servo has been commanded to maintain a velocity, the program will branch to the velocity servo calculations.

If the servo has been commanded to the velocity mode, the next decision to be made is to determine if the commanded velocity is below eight inches per second (for example). If the velocity is below a preset threshold, then the "slow move" velocity servo calculations are performed. The result of these calculations is a new PWM which is loaded into the PWM register in RAM for use by the next interrupt. If the velocity is above the "slow move" threshold, the multiplexer shift sequence must be tested. There are four overlapping velocity windows for the velocity count multiplexer. The multiplexer adjusting software ensures that the correct velocity counting range is selected at all times. The final step for the velocity servo is to calculate the correct PWM to maintain commanded velocity.

The correct pulse width is calculated from the following formula:

$$PWM = (Cv) \times (Vc) + PWM\emptyset + (Cg) \times (Vc - Va)$$

where:
PWM is the new pulse width required
Cv is the slope of the velocity gradient
Vc is the command velocity
PWM0 is the PWM required to turn the motor
Cg is the velocity servo gain
Va is the actual velocity The first term $(Cv \times Vc)$ in the above equation accounts for the counter electromotive force (back emf) generated by the motor. This term represents the PWM required to turn the motor at the commanded speed. The PWM0 term represents the PWM required to just turn the motor in the commanded direction. The PWM0 value compensates for friction in the motor, belt drive, ball screw, and load in addition to bias loading required for load inbalance, such as gravitational load due to a vertical ball screw configuration (Z axis for example). The sum of these two terms yields the PWM required to turn an unloaded motor at the desired speed with neither acceleration or deceleration.

The last term is the servo gain. This term specifies how much additional PWM is required to correct for errors between the commanded velocity and the actual velocity. The servo gain is Cg. The gain is set as high as possible consistent with the stable servo characteristics.

The values of Cv, PWM0 and Cg are customized for each direction of motion and for each axis of the servo.

The summation, PWM, is placed into the PWM register in RAM for use on the next interrupt.

If the servo had been commanded to the stop lock mode of operation, the midground will branch to the position flow chart as shown on FIG. 23. Upon entering the position logic the program will branch depending upon whether the motor is actually stopped or is decelerating to a stopped condition. If the motor is still decelerating, the program will branch to routines which control the desired deceleration ramps. These ramps are velocity dependent and vary for each direction of motion and for each axis of operation.

If the motor is at (or near) the stop lock position, the program will calculate the required PWM from the formula:

$$PWM = PWM\emptyset + (Cp) \times (De) + (Cd) \times (Va)$$

where:
  PWM is the desired pulse width
  PWM$\emptyset$ is the PWM required to turn the motor
  Cp is the position servo gain
  De is the distance error
  Cd is the coefficient of velocity damping
  Va is the actual velocity The first term is the PWM required to just turn the motor in the desired direction. The second term is the PWM which is to be applied to correct for an error in the position of the motor. The third term is the degenerative velocity correction required to prevent overcorrection resulting from the second term (the position correction term introduces a 180° phase lag and is therefore unstable without the degenerative velocity correction). The computed PWM value is stored in the PWM register for use in the next interrupt routine. The midground routines required approximately two and one half milliseconds to execute (including foreground time). This allows for 60/40 sharing of processor time between midground and background software.

Figure 24:
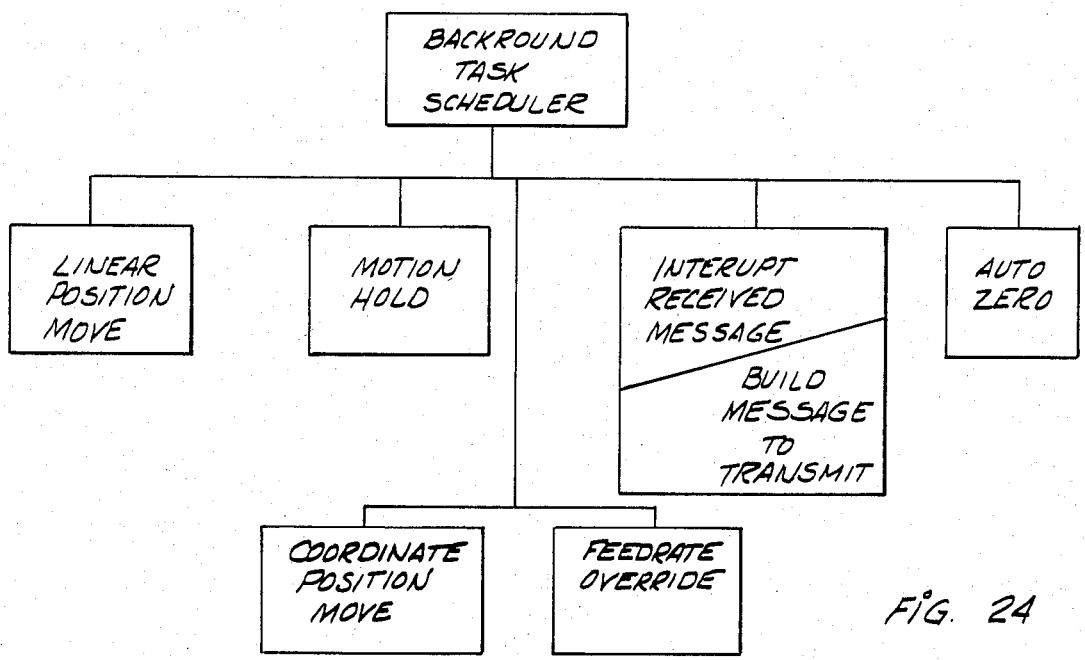

FIG. 24 of the flow charts summarizes the function of the servo control background software. FIGS. 27 through 32 specify the specific tasks performed. The background is broken into six specific jobs. Each job is executed alternately with the PWM generating software described in the midground section above. Each background job has been adjusted such that the midground will executed every three to four milliseconds.

Figure 25:
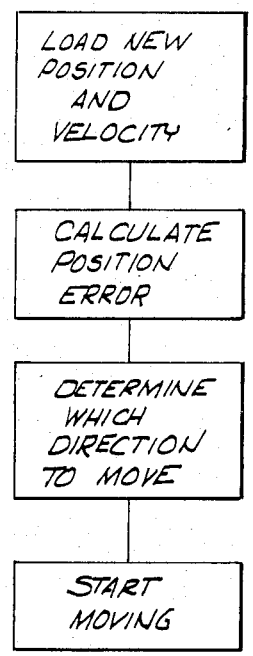

FIG. 25 of the flow charts illustrate the first background routine. If the servo has been commanded to a new position this routine will calculate the information required to accomplish the move. The routine will determine and set the new position target and the velocity commanded for the move. The routine will determine and set the new position target and the velocity commanded for the move. The routine will next compute the position error at which deceleration will commence, to ensure that the motor does not overshoot the target position. Finally, the direction of movement is determined and the initial PWM is output to the motors to initiate motion. If a new position has not been commanded the routine will idle for a compensatory length of time.

Figure 26:
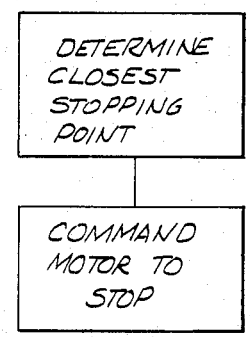

The second background task is illustrated on FIG. 26 of the flow charts. This routine is executed in response to a "Motion Hold" command. First, the software will compute the correct deceleration ramp for the velocity at which the motor is moving. Next the routine computes the closest stop lock position based upon the deceleration ramp. Finally, the stop lock flag is set and the deceleration is initiated.

Figure 27:
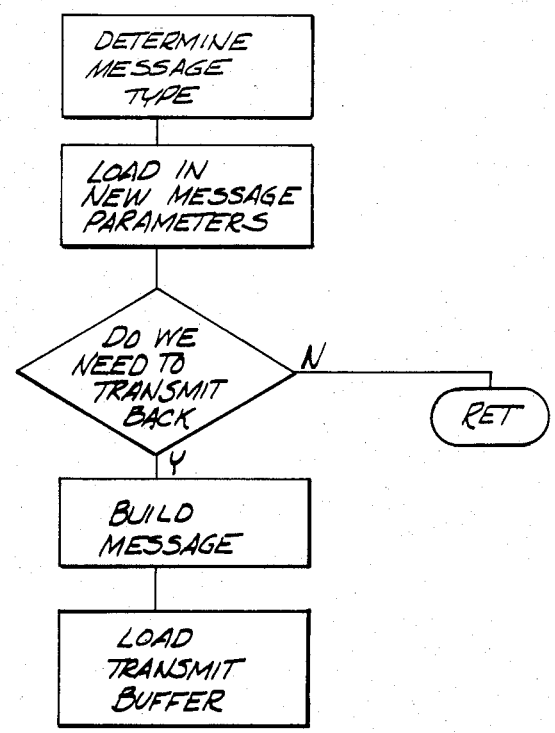

The fourth task, FIG. 27, is the communications background task. This routine processes the messages assembled by the foreground receive routine. The background also builds the message strings which are subsequently transmitted by the foreground transmit routine. First, the receive message is tested for errors. Three tests are performed. The first test is to examine the UART error flags for possible parity, overrun or underrun error. The second test is to determine if the message has a correct check sum (as defined in the communications specification). If these tests are met, the message address is examined to determine if the message is directed to this board (board addresses are set by jumpers for the servo boards). If the message is addressed to this board, the message parameters are separated from the message and loaded into predetermined buffer locations. The contents of these buffers set the mode of operation for the servo.

If the message was addressed to this board, the board is required to make a response as specified in the communications specification. The message is assembled and loaded into the transmit buffer. The foreground transmit routine will send the message, character by character.

Figure 28:
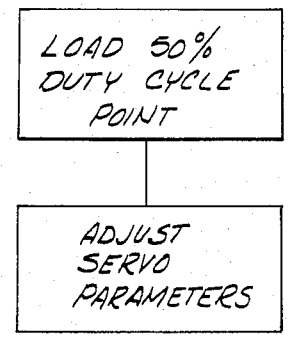

The fourth background job is described on FIG. 28 of the flow charts. This is the "Auto Zero" routine. This routine may be activated upon command from the controller. When activated the routine will update the null PWM for the servo amplifier. This is a self-calibration routine required to compensate for phase lags and inductor inbalance on the servo amplifier board.

Figure 29:
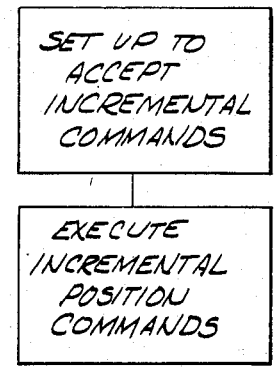

The fifth background job, FIG. 29, processes the coordinated move commands. The coordinated moves commands are preceded by a "Start Coordinated Moves" command. This initial command specifies the offset and gains values to be applied to each of the individual coordinated move steps (refer to the communications specification for detailed description of these command structures). If a coordinated move is in progress, this routine performs the mathematical functions required to process the individual step targets.

Figure 30:
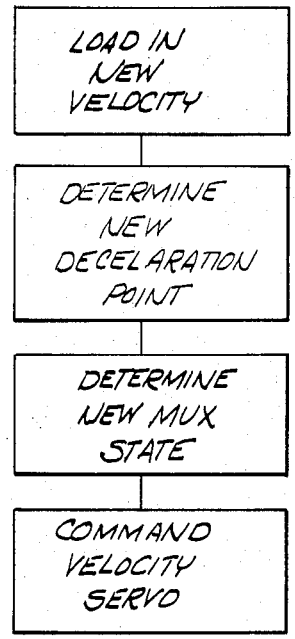

The final background task, FIG. 30, processes the feedrate override command. This command allows the servo to change commanded velocity while a move is in progress. This is usually in response to an operator specifying manual correction to a move in progress. The in progress velocity change requires that the software compute a new deceleration point based upon the new velocity command and the pre-existing position target. The feedrate override routine then determines the correct multiplexer selection for the new command, and sends this correction to the multiplexer. Finally, the routine updates the velocity target registers.

It is contemplated that the inventive concepts herein described may be variously otherwise embodied and it is intended that the appended claims be construed to include alternative embodiments of the invention except insofar as limited by the prior art.

What is claimed is:
1. A method for controlling the relative movement of a workpiece and a tool in a three dimensional space so as to perform desired operations on the workpiece comprising:
  providing a motor control means for moving at least one of said workpiece and tool in a direction along an x, y or z axis; and generating a signal by concurrently performing a first set of tasks including foreground tasks, midground tasks and background tasks;
transmitting said signal to a motor control board;
generating another signal by said motor control board by concurrently performing a second set of tasks including foreground tasks, midground tasks and background tasks; and
using said another signal to operate said motor control means.

2. A method as in claim 1 and further comprising:
executing said foreground tasks of said first set of tasks at periodic time intervals.

3. A method as in claim 2 and further comprising:
generating a set of coordinates for said x axis and said y axis by said midground tasks of said first set of tasks; and
executing said generation of coordinates at periodic time intervals.

4. A method as in claim 3 wherein:
said periodic time interval for said foreground tasks is about 1 millisecond; and
said periodic time interval for said generation of coordinates is about 10 milliseconds.

5. A method as in claim 3 wherein said set of coordinates is generated by:
dividing a 360° circle into eight sectors so that the angle trim in radians is always a fraction less than 1;
executing said midground and background tasks during each of said time intervals.

6. A method as in claim 3 and further comprising:
executing said foreground tasks of said second set of tasks at periodic time intervals.

7. A method as in claim 6 and further comprising:
executing said midground and background tasks of said second set of tasks during said periodic time interval of said foreground tasks of said second set of tasks.

8. A method as in claim 7 wherein:
said periodic time interval for said foreground tasks of said second set of tasks is about 200 microseconds.

9. A method as in claim 7 wherein said midground tasks include:
controlling the velocity mode of each of said motor control means using pulse width modulation.

10. A method as in claim 9 wherein said controlling of said velocity mode of each of said motor control means comprises:
calculating the PWM for said motor control means using the formula:

$$PWM = (Cv) \times (Vc) + PWM\emptyset + (Cg) \times (Vc - Va)$$

where:
PWM is the new pulse width required
Cv is the slope of the velocity gradient
Vc is the command velocity
PWM$\emptyset$ is the PWM required to turn the motor
Cg is the velocity servo gain
Va is the actual velocity.

11. A method as in claim 9 wherein said controlling of said velocity mode of each of said motor control means when said motor is near a stop lock position comprises:
calculating the PWM for said motor control means using the formula:

$$PWM = PWM\emptyset + (Cp) \times (De) + (Cd) \times (Va)$$

where:
PWM is the desired pulse width
PWM$\emptyset$ is the PWM required to turn the motor
Cp is the position servo gain
De is the distance error
Cd is the coefficient of velocity damping
Va is the actual velocity.

12. A method as in claim 9 and further comprising:
using a DC servo electric motor as said motor; and
operating said DC servo electric motor at a relatively high voltage.

13. A method as in claim 12 wherein:
said relatively high voltage is about 160 volts.

14. A method as in claim 12 and further comprising:
connecting a rotatable member to said motor so that rotation of said motor rotates said rotatable member;
connecting said workpiece to said rotatable member so that rotation of said rotatable member moves said workpiece; and
establishing a relatively high speed drive ratio between about 2.4 and 3.2 to 1 between said rotatable member and said DC servo electric motor.

15. A method as in claim 14 wherein:
said ratio between about 3.2 to 1 is along said x and y axis; and
said ratio between about 2.4 to 1 is along said Z-axis.

16. A method as in claim 7 and further comprising:
using a DC servo electric motor as said motor;
connecting a rotatable member to said motor so that rotation of said motor rotates said rotatable member;
connecting said workpiece to said rotatable member so that rotation of said motor rotates said rotatable member;
using the damping characteristics of said DC servo electric motor to hold said workpiece in a locked position.

17. A method as in claim 16 and further comprising:
maintaining the electrical circuit for said DC servo electric motor closed so as to use said dampening characteristic of said DC servo electric motor.

18. A method as in claim 16 and further comprising:
placing compensating inductors around at least four chokes so that either of two pairs provides the inductive compensation to maintain said electrical circuit closed.

19. A method as in claim 18 wherein said electrical circuit comprises:
flowing current in two halves of a cycle through said electrical circuit;
flowing current in the first half of the cycle from a high voltage direct current source, through a power transistor, said DC servo electric motor in a positive direction, a choke, a power transistor and back to said high voltage direct circuit source; and
flowing current in the second half of the cycle from said high voltage direct current source, through a power transistor, said DC servo electric motor in a negative direction, a choke, a power transistor and back to said high voltage direct current source.

20. A method as in claim 19 and further comprising:
controlling the inductance in said electric circuit to about 15 mH.

21. A method as in claim 19 and further comprising:

generating a signal to be fed to said electric circuit for controlling the movement of said DC servo electric motor;

processing said signal by an opto-isolator chip; and feeding said signal to said DC servo electric motor.

22. In apparatus for use in moving a movable element in a computer controlled mechanism wherein the movable element is connected to a rotatable member so that rotation of the rotatable member moves the movable element and wherein the rotatable member is rotated by a DC servo electric motor, the improvement comprising:

means for establishing a relatively high speed drive ratio of between about 2.4 and 3.2 to 1 between said rotatable member and said DC servo electric motor.

23. The improvement as in claim 22 wherein:

said DC servo electric motor operates at a relatively high DC voltage.

24. The improvement as in claim 23 wherein:

said relatively high DC voltage is about 160 volts.

25. The improvement as in claim 24 wherein said means for establishing a relatively high drive ratio includes:

a belt drive means.

26. The improvement as in claim 25 wherein said belt drive means comprises:

a first pulley secured to the free end of the shaft of said DC servo electric motor;

a plurality of spaced apart teeth on the periphery of said first pulley;

a second pulley secured to the free end of said rotatable member;

a plurality of spaced apart teeth on the periphery of said second pulley;

said second pulley having a diameter greater than the diameter of said first pulley;

a continuous cog belt having a plurality of spaced apart cogs on the inner surface thereof; and said continuous cog belt being trained around said first and second pulleys so that said cogs mesh with said plurality of teeth on said first and second pulleys so as to provide a positive drive between said DC servo electric motor and said rotatable member.

27. The improvement as in claim 22 wherein:

said DC servo electric motor is controlled solely by an optical encoder.

28. The improvement as in claim 27 wherein:

said optical encoder utilizes a disk having about 500 lines per revolution.

29. The improvement as in claim 28 wherein said optical encoder includes:

a transparent disk having a plurality of radially extending lines thereon;

a first light emitting diode positioned adjacent to one side of said disk and opposite to said plurality of lines; and a first photo transistor positioned adjacent to the other side of said disk and opposite to said plurality of lines so that light emitted by said first light emitting diode may pass through an area between adjacent lines and be picked up by said first photo transistor.

30. The improvement as in claim 29 and further comprising:

a second light emitting diode positioned to said one side of said metal disk and opposite to said plurality of lines;

a second photo transistor positioned adjacent to said other side of said disk and opposite to said plurality of lines so that light emitted by said second light emitting diode may pass through an area between adjacent lines and be picked up by said second photo transistor; and said second light emitting diode and said second photo transistor are spaced 90° from said first light emitting diode and said first photo transistor.

31. Apparatus for controlling the relative movement of a workpiece and a tool in a three-dimensional space so as to perform desired operations on the workpiece comprising:

means for mounting a workpiece on a work table;

means for mounting a tool adjacent to said work table;

means for causing relative movement of one of said workpiece and said tool in a three-dimensional space along a x-axis, a y-axis or a z-axis;

said means for causing relative movement includes a DC servo electric motor associated with each of said x-axis, y-axis and z-axis;

a motor control board for each of said DC servo electric motors;

each of said motor control boards concurrently performing a set of tasks including foreground tasks, midground tasks and background tasks to generate a signal; and means for transmitting each generated signal to an associated one of said DC servo electric motors.

32. Apparatus for controlling the relative movement of a workpiece and a tool in a three dimensional space so as to perform desired operations on said workpiece comprising:

means for mounting a workpiece on a work table;

means for mounting a tool adjacent to said work table;

means for causing relative movement of one of said workpiece and said tool in a three-dimensional space along a x-axis, a y-axis or a z-axis;

said means for causing relative movement includes a DC servo electric motor associated with each of said x-axis, y-axis and z-axis;

a motor control board for each of said DC servo electric motors;

each of said motor control boards concurrently performing a set of tasks to generate a signal;

means for transmitting each generated signal to an associated one of said DC servo electric motors; and an opto-isolator chip located between each of said motor control boards and each of said DC servo electric motors and through which said signal is transmitted.

33. Apparatus as in claim 31 and further comprising:

an electric circuit for using the damping characteristics of each of said DC servo electric motors to retain said means for causing relative movement in a stop hold mode.

34. Apparatus as in claim 33 wherein:

said electric circuit includes at least four chokes.

35. Apparatus as in claim 34 and further comprising:

an H style motor drive amplifier for each of said DC servo electric motors; and one of said chokes being located in each leg of said H style motor drive amplifiers.

36. Apparatus as in claim 35 wherein said electric circuit comprises:
- a 160 volt DC power source, a power transistor, a choke, a DC servo electric motor positive direction, another choke and another power transistor in a first half cycle; and
- a 160 volt DC power source, a power transistor, a choke, a DC servo electric motor negative direction, another choke and another power transistor in a second half-cycle.

37. Apparatus as in claim 31 wherein:
said signal is generated in accordance with the following formula:

$$PWM = (Cv) \times (Vc) + PWM\emptyset + (Cg) \times (Vc - Va)$$

where:
PWM is the new pulse width desired
Cv is the slope of the velocity
Vc is the commanded velocity
PWM$\emptyset$ is the PWM required to turn the motor
Cg is the velocity servo gain
Va is the actual velocity.

38. Apparatus as in claim 31 wherein:
said signal is generated in accordance with the following formula when said motor is near a stop lock position:

$$PWM = PWM\emptyset + (Cp) \times (De) + (Cd) \times (Va)$$

where:
PWM is the desired pulse width
PWM$\emptyset$ is the PWM required to turn the motor
Cp is the position servo gain
De is the distance error
Cd is the coefficient of velocity damping
Va is the actual velocity.

39. Apparatus as in claim 31 wherein said means for causing movement comprises:
- a rotatable member for each of said x-axis, y-axis and z-axis; and
- means for connecting each of said rotatable members to one of said DC servo electric motors so that the ratio of rotation of said rotatable member to said DC servo electric motor is at least about 2.4 to 1.

40. Apparatus as in claim 31 wherein said means for causing movement comprises:
- a rotatable member for each of said x-axis and said y-axis; and
- means for connecting each of said rotatable members to one of said DC servo electric motors so that the ratio of rotation of said rotatable member to said DC servo electric motor is at least 3.2 to 1.

41. Apparatus as in claim 31 and further comprising:
- an optical tachometer associated with each of said DC servo electric motors; and
- each of said optical tachometers having about 500 lines per revolution.

42. Apparatus as in claim 41 and further comprising:
- an optical encoder associated with each one of said optical tachometer.

43. Apparatus as in claim 31 and further comprising:
- means for generating a signal by concurrently performing a first set of tasks including foreground tasks, midground tasks and background tasks and transmitting said signal to each of said motor control boards.

* * * * *